US009207931B2

(12) United States Patent
Fox et al.

(10) Patent No.: US 9,207,931 B2
(45) Date of Patent: Dec. 8, 2015

(54) SYSTEM AND METHOD OF PROVIDING REAL-TIME UPDATES RELATED TO IN-USE ARTIFACTS IN A SOFTWARE DEVELOPMENT ENVIRONMENT

(71) Applicant: Sonatype, Inc., Fulton, MD (US)

(72) Inventors: Brian Edward Fox, Goffstown, NH (US); Joel Orlina, Silver Spring, MD (US)

(73) Assignee: Sonatype, Inc., Fulton, MD (US)

( * ) Notice: Subject to any disclaimer, the term of this patent is extended or adjusted under 35 U.S.C. 154(b) by 0 days.

(21) Appl. No.: 14/140,167

(22) Filed: Dec. 24, 2013

(65) Prior Publication Data

US 2014/0115562 A1    Apr. 24, 2014

Related U.S. Application Data

(63) Continuation of application No. 13/369,617, filed on Feb. 9, 2012, now Pat. No. 8,656,343.

(51) Int. Cl.
G06F 9/44       (2006.01)
G06F 9/445      (2006.01)

(52) U.S. Cl.
CPC .. G06F 8/70 (2013.01); G06F 8/65 (2013.01); G06F 8/72 (2013.01)

(58) Field of Classification Search
None
See application file for complete search history.

(56) References Cited

U.S. PATENT DOCUMENTS

| | | |
|---|---|---|
| 5,615,400 A | 3/1997 | Cowsar et al. |
| 6,167,535 A | 12/2000 | Foote et al. |
| 6,282,698 B1 | 8/2001 | Baker et al. |
| 6,931,544 B1 | 8/2005 | Kienhöfer et al. |
| 7,080,355 B2 | 7/2006 | Carlson et al. |
| 7,149,734 B2 | 12/2006 | Carlson et al. |
| 7,159,206 B1 | 1/2007 | Sadhu et al. |
| 7,234,131 B1 | 6/2007 | Speyrer et al. |
| 7,322,024 B2 | 1/2008 | Carlson et al. |
| 7,340,719 B1 | 3/2008 | Bakerman et al. |
| 7,343,386 B2 | 3/2008 | Gomes et al. |
| 7,506,312 B1 | 3/2009 | Girolami-Rose et al. |
| 7,644,101 B2 | 1/2010 | Yano |

(Continued)

OTHER PUBLICATIONS

Cook et al., "Modelling and measuring Collaborative Software Engineering," 2005, Proceedings of the Twenty-eighth Australasian conference on Computer Science—vol. 38, pp. 267-276.*

(Continued)

Primary Examiner — Thuy Dao
Assistant Examiner — Stephen Berman
(74) Attorney, Agent, or Firm — Posz Law Group, PLC

(57) ABSTRACT

An artifact update system including a server and a client is described. The server stores and updates a preference as to a characteristic of an artifact. The client executes a software development environment using the artifact. The server makes, in view of the preference as to the characteristic of the artifact, an actionable change determination as to whether there is a change in the characteristic of the artifact that reaches a threshold level of significance. The server communicates to the client the actionable change determination. When the actionable change determination is that there is a change in the characteristic of the artifact that reaches the threshold level of significance, the client performs a specific action in the software development environment in response to the actionable change determination.

18 Claims, 8 Drawing Sheets

(56) References Cited

U.S. PATENT DOCUMENTS

| | | | |
|---|---|---|---|
| 7,707,162 B2 | 4/2010 | Naphade et al. | |
| 7,716,636 B2 | 5/2010 | Goncharenko et al. | |
| 7,735,068 B2 | 6/2010 | Siddarampappa et al. | |
| 7,788,632 B2 | 8/2010 | Kuester et al. | |
| 7,810,087 B2 | 10/2010 | O'Brien | |
| 7,814,078 B1 | 10/2010 | Forman et al. | |
| 7,844,592 B2 | 11/2010 | Shoval et al. | |
| 7,877,391 B2 | 1/2011 | Bird et al. | |
| 7,958,494 B2 | 6/2011 | Chaar et al. | |
| 8,037,453 B1 | 10/2011 | Zawadzki | |
| 8,060,871 B2 | 11/2011 | Bernabeu-Auban et al. | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2 | 4/2012 | Brady | |
| 8,161,470 B2 | 4/2012 | Bottomley et al. | |
| 8,225,281 B1 | 7/2012 | Hardinger et al. | |
| 8,280,755 B2 | 10/2012 | Stuhec et al. | |
| 8,296,251 B1 | 10/2012 | Athayde | |
| 8,327,318 B2 | 12/2012 | Chaar et al. | |
| 8,356,278 B2 | 1/2013 | Drissi et al. | |
| 8,359,285 B1 | 1/2013 | Dicker et al. | |
| 8,359,566 B2 | 1/2013 | Chaar et al. | |
| 8,359,571 B2 | 1/2013 | Clemm et al. | |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1 | 7/2013 | Kawashima et al. | |
| 8,484,617 B2 | 7/2013 | Goh et al. | |
| 8,484,625 B2 | 7/2013 | Saha et al. | |
| 8,499,284 B2 | 7/2013 | Pich et al. | |
| 8,533,723 B1* | 9/2013 | Badenell et al. | 718/104 |
| 8,539,437 B2 | 9/2013 | Finlayson et al. | |
| 8,543,979 B2 | 9/2013 | Arcese et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,745,572 B2 | 6/2014 | Zimmermann et al. | |
| 8,856,724 B2 | 10/2014 | Somani et al. | |
| 8,875,090 B2 | 10/2014 | Fox et al. | |
| 9,043,753 B2 | 5/2015 | Fox et al. | |
| 2002/0049962 A1 | 4/2002 | Kelbaugh et al. | |
| 2002/0052910 A1 | 5/2002 | Bennett et al. | |
| 2002/0059475 A1 | 5/2002 | Baentsch et al. | |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0117413 A1 | 6/2004 | Brown et al. | |
| 2004/0230949 A1 | 11/2004 | Talwar et al. | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0204340 A1 | 9/2005 | Ruminer et al. | |
| 2005/0210441 A1* | 9/2005 | Tarr et al. | 717/101 |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0041856 A1* | 2/2006 | Holloway et al. | 717/101 |
| 2006/0048097 A1 | 3/2006 | Doshi | |
| 2006/0101092 A1 | 5/2006 | Ishida et al. | |
| 2006/0149717 A1 | 7/2006 | Bird et al. | |
| 2006/0150153 A1 | 7/2006 | Altman | |
| 2006/0236083 A1* | 10/2006 | Fritsch et al. | 713/1 |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0061495 A1 | 3/2007 | Cummins et al. | |
| 2007/0061792 A1 | 3/2007 | Atsatt | |
| 2007/0089086 A1 | 4/2007 | Ortloff | |
| 2007/0118899 A1 | 5/2007 | Sridhar et al. | |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028371 A1 | 1/2008 | Brothers et al. | |
| 2008/0028378 A1 | 1/2008 | Biswas et al. | |
| 2008/0066050 A1 | 3/2008 | Jain et al. | |
| 2008/0098360 A1* | 4/2008 | Klinger et al. | 717/128 |
| 2008/0109801 A1* | 5/2008 | Levine et al. | 717/171 |
| 2008/0127040 A1 | 5/2008 | Barcellona | |
| 2008/0154965 A1 | 6/2008 | Pedersen | |
| 2008/0178154 A1 | 7/2008 | Basler et al. | |
| 2008/0229300 A1 | 9/2008 | O'Brien | |
| 2008/0235680 A1 | 9/2008 | Strauss et al. | |
| 2008/0263505 A1 | 10/2008 | StClair et al. | |
| 2008/0270374 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0133006 A1 | 5/2009 | Cheung | |
| 2009/0138843 A1 | 5/2009 | Hinton et al. | |
| 2009/0144698 A1 | 6/2009 | Fanning et al. | |
| 2009/0193063 A1* | 7/2009 | Leroux et al. | 707/204 |
| 2009/0271777 A1* | 10/2009 | Tow et al. | 717/171 |
| 2009/0300404 A1 | 12/2009 | Branson et al. | |
| 2009/0307662 A1 | 12/2009 | Ackerman | |
| 2009/0327994 A1* | 12/2009 | Christensen et al. | 717/106 |
| 2010/0017252 A1* | 1/2010 | Chaar et al. | 705/9 |
| 2010/0023919 A1 | 1/2010 | Chaar et al. | |
| 2010/0023920 A1 | 1/2010 | Chaar et al. | |
| 2010/0058291 A1 | 3/2010 | Hahn et al. | |
| 2010/0058295 A1 | 3/2010 | Johnson et al. | |
| 2010/0063975 A1 | 3/2010 | Hayes | |
| 2010/0100543 A1 | 4/2010 | Brady | |
| 2010/0106705 A1 | 4/2010 | Rush et al. | |
| 2010/0153920 A1 | 6/2010 | Bonnett | |
| 2010/0211924 A1 | 8/2010 | Begel et al. | |
| 2010/0306730 A9 | 12/2010 | Carlson et al. | |
| 2010/0325602 A1 | 12/2010 | Kraft et al. | |
| 2010/0333067 A1 | 12/2010 | Goh et al. | |
| 2011/0010685 A1 | 1/2011 | Sureka et al. | |
| 2011/0023007 A1 | 1/2011 | Chumbley et al. | |
| 2011/0023016 A1 | 1/2011 | Khader et al. | |
| 2011/0055186 A1 | 3/2011 | Gopalkrishnan | |
| 2011/0066619 A1 | 3/2011 | Perantatos et al. | |
| 2011/0107301 A1 | 5/2011 | Chan et al. | |
| 2011/0119289 A1 | 5/2011 | Fields et al. | |
| 2011/0137807 A1 | 6/2011 | Cha | |
| 2011/0145810 A1 | 6/2011 | Forsyth | |
| 2011/0161938 A1 | 6/2011 | Marum et al. | |
| 2011/0231471 A1* | 9/2011 | Kudikala et al. | 709/202 |
| 2011/0258162 A1 | 10/2011 | Lam | |
| 2011/0289098 A1 | 11/2011 | Oztaskent et al. | |
| 2011/0296396 A1 | 12/2011 | Kurtakov | |
| 2011/0307862 A1 | 12/2011 | Abrams et al. | |
| 2011/0314438 A1 | 12/2011 | Surazski et al. | |
| 2012/0011496 A1 | 1/2012 | Shimamura | |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0144363 A1 | 6/2012 | Bernardini et al. | |
| 2012/0159420 A1 | 6/2012 | Yassin et al. | |
| 2012/0174084 A1 | 7/2012 | Chapman et al. | |
| 2012/0180024 A1 | 7/2012 | Gonzalez et al. | |
| 2012/0246616 A1 | 9/2012 | Frontiero et al. | |
| 2012/0272205 A1 | 10/2012 | Fox et al. | |
| 2012/0311534 A1 | 12/2012 | Fox et al. | |
| 2012/0317546 A1 | 12/2012 | Arcese et al. | |
| 2012/0324419 A1 | 12/2012 | Roberts et al. | |
| 2012/0331439 A1 | 12/2012 | Zimmermann et al. | |
| 2012/0331447 A1 | 12/2012 | Nayak et al. | |
| 2013/0007704 A1 | 1/2013 | Haynes et al. | |
| 2013/0036400 A1 | 2/2013 | Bak et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0074038 A1 | 3/2013 | Fox et al. | |

(56) References Cited

U.S. PATENT DOCUMENTS

| | | |
|---|---|---|
| 2013/0191808 A1 | 7/2013 | Fox et al. |
| 2013/0212562 A1 | 8/2013 | Fox et al. |
| 2013/0227517 A1 | 8/2013 | Fox et al. |
| 2013/0311496 A1 | 11/2013 | Fedorenko et al. |
| 2013/0326469 A1 | 12/2013 | Fox et al. |
| 2014/0026121 A1 | 1/2014 | Jackson |
| 2014/0075414 A1 | 3/2014 | Fox et al. |
| 2014/0101633 A1 | 4/2014 | Fox et al. |
| 2014/0207753 A1 | 7/2014 | Fox et al. |

OTHER PUBLICATIONS

Yu et al., "Traceability for the maintenance of secure software," 2008, IEEE International Conference on Software Maintenance, pp. 297-306.*
Bani-Salameh et al., "A Social Collaborative virtual environment for software development," 2010, International Symposium on Collaborative Technologies and Systems (CTS), pp. 46-55.*
U.S. Appl. No. 13/554,335, filed Jul. 20, 2012, Jackson et al.
U.S. Appl. No. 13/744,542, filed Jan. 18, 2013, Fox et al.
U.S. Appl. No. 14/078,151, filed Nov. 12, 2013, Fox et al.
U.S. Appl. No. 14/102,713, filed Dec. 18, 2013, Fox et al.
Sourceforge, List of Current OSS Discovery Fingerprints [online] [retrieved on May 27, 2012] Retrieved from the internet: <http://ossdiscovery.sourceforge.net/fingerprints.html>.
Sourceforge, OSS Discovery FAQ [online] [retrieved on May 27, 2012] Retrieved from the internet: <http://ossdiscovery.sourceforge.net/faq.html>.
Cubranic et al., "Hipikat: Recommending Pertinent Software Development Artifacts," 2003, Proceedings of the 25th International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Milanovic et al., "Model & Metamodel, Metadata and Document Repository for Software and Data Integration", 2008, MoDELS 2008, LNCS 5301, pp. 416-430, 2008.
Sherman, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Ji et al., "Efficient Interactive Fuzzy Keyword Search", WWW 2009, Apr. 20-24, 2009, ACM 978-1-60558-487—Apr. 9, 2004, pp. 371-380.
Happel et al., Potentials and Challenges of Recommendation Systems for Software Development, RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
Notice of Allowance issued by the U.S. Patent Office on Jan. 22, 2013 in connection with related U.S. Appl. No. 13/089,751.
Notice of Allowance issued by the U.S. Patent Office on Mar. 15, 2013 in connection with related U.S. Appl. No. 13/483,412.
Office Action issued by the U.S. Patent Office on Apr. 8, 2013 in connection with related U.S. Appl. No. 13/151,816.
Office Action issued by the U.S. Patent Office on Apr. 9, 2013 in connection with related U.S. Appl. No. 13/231,162.
Gacek, "Exploiting Domain Architectures in Software Reuse", 1992, ACM 0-89791-739—1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21st International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
Office Action issued by the U.S. Patent Office on Sep. 24, 2013 in connection with related U.S. Appl. No. 13/476,160.
Office Action issued by the U.S. Patent Office on Oct. 2, 2013 in connection with related U.S. Appl. No. 13/554,335.
Google, classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006, pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and the Written Opinion of the International Searching Authority mailed on Oct. 15, 2013 by the International Searching Authority in connection with international application No. PCT/US2013/041785, which corresponds to related U.S. Appl. No. 13,476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+rep 1&type=pdf>, entire document.
Chilowicz et al. Syntax tree fingerprinting: a foundation for source code similarity detection. Sep. 29, 2011 [Retrieved on 2013-26]. Retrieved from the Internet: <URL: http://hal-upec-mlv.archives-ouvertest.fr/docs/00/62/78/11/PDF/HAL.pdf>, entire document.
Final Office Action issued by the U.S. Patent Office on Feb. 25, 2014 in connection with related U.S. Appl. No. 13/554,335.
Office Action issued by the U.S. Patent Office on Mar. 10, 2014 in connection with related U.S. Appl. No. 13/233,265.
Notice of Allowance issued by the U.S. Patent Office on Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.
Notice of Allowance issued by the U.S. Patent Office on Jul. 9, 2014 in related U.S. Appl. No. 13/861,065.

(56) References Cited

OTHER PUBLICATIONS

Froehlich et al., "Unifying Artifacts and Activities in a Visual Tool for Distributed Software Development Teams," 2004, Proceedings of the 26$^{th}$ International Conference on Software Engineering, pp. 387-396.
U.S. Appl. No. 14/271,648, filed May, 7, 2014, Fedorenko.
Grundy et al., "Inconsistency management for multiple-view software development environments," 1998, IEEE Transactions on Software Engineering, vol. 24, Issue: 11, pp. 960-981.
Han, "Supporting impact analysis and change propagation in software engineering environments," 1997, Proceedings Eight IEEE International Workshop on Software Technology and Engineering Practice incorporating Computer Aided Software Engineering, pp. 172-182.
Office Action issued by the U.S. Patent Office on Oct. 1, 2014 in connection with related U.S. Appl. No. 13/554,335.
Office Action issued by the U.S. Patent Office on Oct. 7, 2014 in connection with related U.S. Appl. No. 14/078,151.
Office Action issued by the U.S. Patent Office on Oct. 22, 2014 in connection with related U.S. Appl. No. 13/962,122.
Office Action issued by the U.S. Patent Office on Oct. 23, 2014 in related U.S. Appl. No. 13/233,265.
Office Action issued by the U.S. Patent Office on Nov. 26, 2014 in related U.S. Appl. No. 14/102,713.
International Preliminary Report on Patentability issued by the International Bureau of WIPO on Dec. 4, 2014 in related International application No. PCT/US2013/041785.
Notice of Allowance issued by the U.S. Patent Office on Apr. 27, 2015 in related U.S. Appl. No. 13/962,122.
Podgurski et al., "Retrieving reusable software by sampling behavior", 1993, ACM Transactions on Software Engineering and Methodology, vol. 2, Issue 3, pp. 286-303.
De Luca et al., "Recovering traceability links in software artifact management systems using information retrieval methods", 2007, ACM Transactions on Software Engineering and Methodology, vol. 16, Issue 4, Article No. 13, pp. 1-50.
Ravichandran et al., "Software reuse strategies and component markets" , 2003, Communications of the ACM—Program compaction, vol. 46, Issue 8, pp. 109-114.
Notice of Allowance issued by the U.S. Patent Office on May 15, 2015 in related U.S. Appl. No. 13/744,542.
Notice of Allowance issued by the U.S. Patent Office on May 27, 2015 in related U.S. Appl. No. 13/554,335.
Malabarba et al., "Runtime Support for Type-Safe Dynamic Java Classes", 2000, ECOOP 2000—Object-Oriented Programming Lecture Notes in Computer Science, vol. 1850, pp. 337-361.
Liang et al., "Dynamic class loading in the Java virtual machine", 1998, Proceedings of the 13$^{th}$ ACM SIGPLAN conference on Object-oriented programming, systems, languages, and applications, pp. 36-44.
Goldberg et al., "A specification of Java loading and bytecode verification", 1998, Proceedings of the 5$^{th}$ ACM conference on Computer and communications security, pp. 49-58.
Office Action issued by the U.S. Patent Office on Jun. 26, 2015 in related U.S. Appl. No. 14/102,713.
Notice of Allowance issued by the U.S. Patent Office on May 19, 2015 in related U.S. Appl. No. 13/233,265.
Williams et al., "Automatic mining of source code repositories to improve bug finding techniques", 2005, IEEE Transaction on Software Engineering (vol. 30, Issue: 6), pp. 466-480.
Ying et al., "Predicting source code changes by mining change history", 2004, IEEE Transactions on Software Engineering (vol. 30, Issue: 9), pp. 574-586.
Storey et al., "TODO or to bug: exploring how task annotations play a role in the work practices of software developers", 2008, Proceedings of the 30$^{th}$ International conference on Software engineering, pp. 251-260.

\* cited by examiner

REPOSITORY MANAGER

SYSTEM AND METHOD OF PROVIDING REAL-TIME UPDATES RELATED TO IN-USE ARTIFACTS IN A SOFTWARE DEVELOPMENT ENVIRONMENT

CROSS-REFERENCE TO RELATED APPLICATIONS

This application is a continuation of U.S. patent application Ser. No. 13/369,617 (now U.S. Pat. No. 8,656,343), filed Feb. 9, 2012, which is expressly incorporated herein by reference.

TECHNICAL FIELD

The technical field relates in general to software development, and more specifically to providing updates related to artifacts that are in use in various software development environments.

BACKGROUND

All software developers, in whatever language and platform, and whatever methodology, realize that there is some software that they don't want to write, and that already exists. Developers that write their own software conventionally will use published artifacts as building blocks in writing code within a larger project, so as to avoid re-writing software that already exists. For any given task, there may be multiple artifacts that can possibly do what the programmer/developer needs to do.

However, determining and maintaining an appropriate artifact for a particular project can be difficult. A software artifact that is appropriate for one project may not be particularly appropriate for the same use in another project. Further, once an artifact is selected and in use in a project, changes to the artifact may effect the artifact's ongoing suitability for the project in which it is being used.

The initial determination of an appropriate artifact is discussed in the present disclosure for the purpose of establishing background material related to the claimed embodiments. However, the focus of this disclosure relates to ensuring that an in-use artifact continues to be appropriate in a particular software development environment for a particular user. It should be noted that an initial determination of an appropriate artifact is discussed in greater detail in U.S. patent application Ser. No. 13/089,751 (now U.S. Pat. No. 8,438,532) and in U.S. patent application Ser. No. 13/151,816 (now U.S. Pat. No. 8,612,936).

SUMMARY

Accordingly, one embodiment disclosed herein provides a method that is implemented by a client device and a server device, the method relating to a software artifact used in a software development environment operating on the client device. The method comprises storing in the server device, artifact preferences of artifact characteristics. The artifact preferences are determined according to objective and subjective criteria. The method further comprises performing an update cycle. The update cycle includes the server device communicating to the client device whether there is an actionable change to the software artifact with respect to the artifact preferences. The update cycle further includes, when the server device communicates that there is an actionable change to the software artifact, the client device performing an update action in the software development environment in response to the actionable change.

A second embodiment disclosed herein provides a system that comprises a server device and a client device. The server device stores artifact preferences, determined according to objective and subjective criteria, of artifact characteristics. The client device executes a software development environment. The software development environment makes use of a software artifact. An update cycle is performed by the client device and the server device. The update cycle includes the server device communicating to the client device whether there is an actionable change to the software artifact with respect to the artifact preferences. The update cycle further includes, when the server device communicates that there is an actionable change to the software artifact, the client device performing an update action in the software development environment in response to the actionable change.

A third embodiment disclosed herein is a computer readable storage medium with instructions stored thereon, that when executed by a client device performs a method related to a software artifact used in a software development environment operating on the client device. The client device executing the instructions stored on the computer readable storage medium is connected over a network with a server device. The server device stores artifact preferences, determined according to objective and subjective criteria of artifact characteristics. The instructions when executed by the client device perform a method comprising polling the server device as to whether there is an actionable change to the software artifact with respect to the artifact preferences. The method further comprises receiving from the server device an indication whether there is an actionable change to the software artifact with respect to the artifact preference, and when the server device communicates that there is an actionable change to the software artifact, performing an update action in the software development environment in response to the actionable change.

It should be noted that the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to define the invention of the application, which is measured by the claims. The Abstract is further not intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
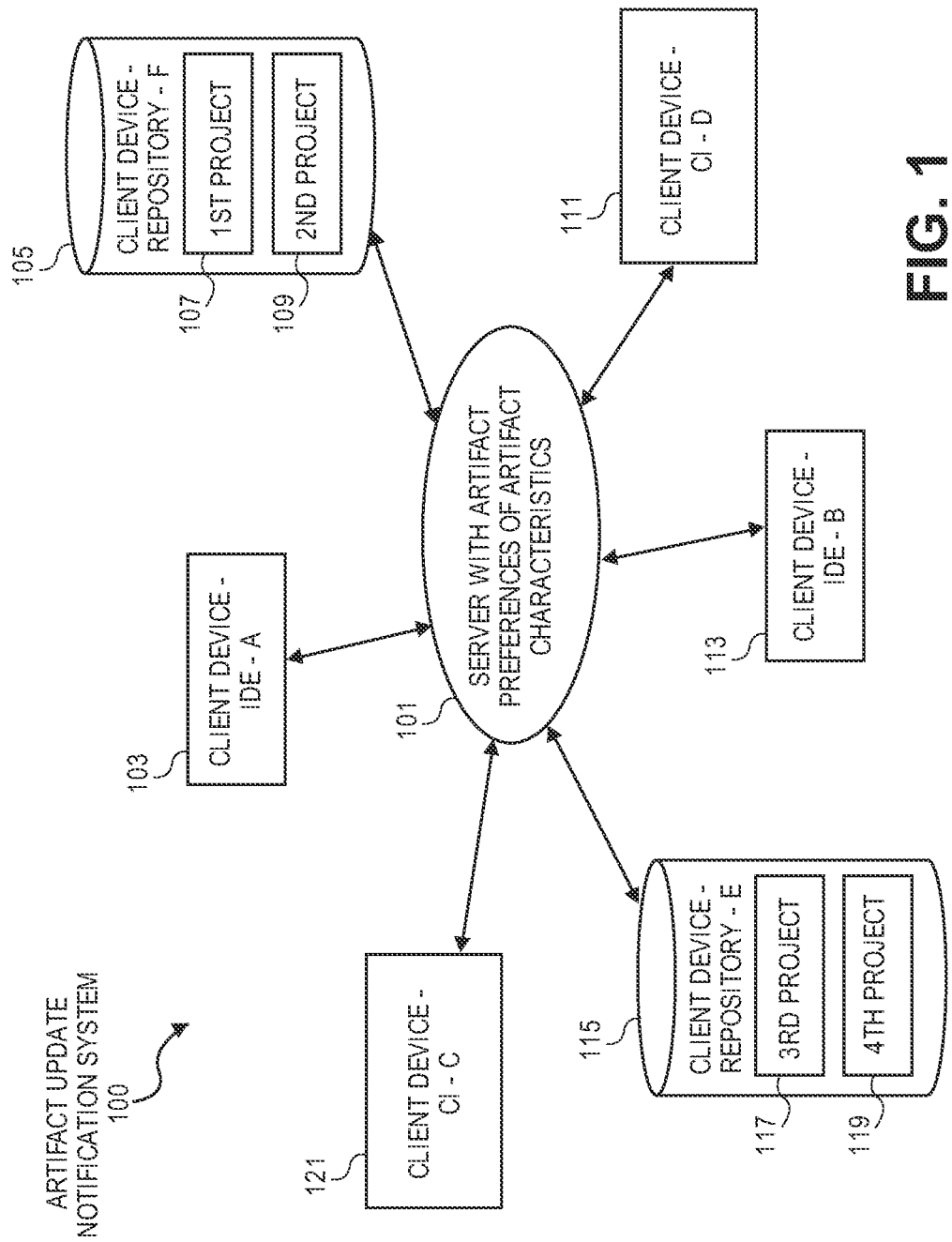
FIG. 1 is a diagram illustrating the structure of an exemplary artifact update notification system with a client/server architecture.

In overview, the present disclosure concerns software development, in which software code building blocks known as artifacts, and sometimes referred to as binary or source code, have been published after a formal process of vetting and then being released for use as one of plural building blocks to be used in a complete piece of software. Such software development includes utilizing build management tools, for example that assist in controlling the software artifacts that are selected and/or are used in a project.

Novel systems, devices, and methods have been put forward that are designed to provide information about the appropriateness of a software artifact (such as artifact scoring) in a particular software development project. Additionally, novel systems, devices, and methods have been put forward that recommend one or more software artifacts based on both objective qualities of candidate artifacts and subjective considerations of the artifact users. These novel systems, devices, and methods aid artifact users in making an initial determination as to which artifact or artifacts will be useful in their software development.

Artifact development, however, is constantly changing. Artifact authors are continuously updating their own artifacts into newer versions of the artifact, and in the open-source world, artifacts are updated by non-original authors who further develop dependencies of published artifacts. Additionally, information may be obtained related to any of the various objective criteria or subjective criteria (discussed further below) that factored into an initial determination that a particular artifact was appropriate for a particular artifact user. Thus, the presently claimed embodiments are directed to ensuring that an in-use artifact continues to be suitable for a user as changes made to the artifact or relevant information is obtained about the artifact.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Begin—First Set Definitions

The claims use the following terms which are defined to have the following meanings for the purpose of the claims herein.

The terms "artifact" or "software artifact" or "software build artifact" used herein is defined to be a specific version of an existing reusable software code building block, which is binary or source code, that has been published, for example as referred to in the open source model, to a publicly available repository, such that it was vetted, approved, indexed so it can be located, and formally released to the public, but is not a complete stand-alone finished product. The term "artifact", "software artifact" or "software build artifact" is not used herein in the broad sense. A concrete example of an artifact is something like, e.g., Hibernate_3, which is an object-relational mapper which allows the JAVA developer to interact with relational database as if using native object oriented code. Its Group ID is org.hibernate, its artifact ID is artifact-core, its version is 3.0. Less formally, the artifact can be understood to be a bit of code which a developer does not wish to write himself/herself and so the developer uses an artifact which is published in a repository. In the MAVEN world, for example, there is a known pre-defined process for publishing an artifact to the MAVEN central web-site or other publicly available repository.

The terms "computer system" or "computer" used herein denotes a device with processing capability, sometimes referred to as a computer, laptop, personal computer, personal digital assistant, notebook computer, personal assignment pad, mainframe computer, and variations and equivalents thereof.

The terms "server", "server computer", or "server device" as used herein denote a computer or device on a network that operates to perform computational tasks to serve the needs of computers on the network, known as "clients". Thus the terms "client", "client computer", and "client device" as used herein denote a computer that accesses a service or task made available by a server. It should be noted that a server computer can simultaneously function as a client.

The term "software development environment" as used herein denotes any software application used in developing additional software. Well known examples of software development environments include integrated development environments ("IDE"), continuous integration ("CI") systems, and repository management applications.

End—First Set Definitions

Additional definitions are presented further below in this description after preliminary material is presented that may aid in a better understanding of the defined terms. Such definitions will be presented in the same manner as above so as to be easily recognizable. Further, although certain terms do not appear in the claims, it is none the less helpful to set out a working definition for these terms. For example, the term "user" is used in this description to refer to a software developer, a line coder, a technical architect, a development lead, or a development manager who is running a team of one or more developers, any of which are working on a software deliverable; or a C-level individual (CIO, CSO, and the like); or an individual that sets or enforces governing standards for software deliverables such as for vulnerability or licensing or artifacts. The term "user" is not used herein in the broad, common sense. The user can be management level because management can have final veto power over the software components in the software deliverable resulting from a project. Typically, but not always, an individual developer will not have the final say over which artifacts are approved.

The term "metadata" is used in this description to refer to the content and context of a file with which it is associated. Metadata that is associated with a software artifact can indicate a project to which the artifact belongs, a security of the artifact or a license that is associated with the artifact, among other things.

"Open source" software is used in this description to refer to source code that allows distribution as source code as well as in compiled form, with a well-publicized and indexed means of obtaining the source, optionally with a license that allows modifications and derived works.

The term "Open Source Definition" is used in this description to refer to the Open Source Definition available from the Open Source Initiative, variations and evolutions thereof.

The term "software build" used in this description to refer to a process as pre-defined in an executable build program of converting a plurality of artifacts obtained from a repository and combining the results into an executable stand-alone computer program or a software artifact for use in a further software build, including at least compiling artifacts and linking compiled artifacts and possibly binary artifacts from the repository, in a pre-determined order as defined in the build program.

The term "project" is used in this description to refer to a pre-defined collection of related software artifacts which a group of users maintains; a project can be uniquely identified by a group ID, artifact ID, and version number. A project has a unique project name, a URL specific to the project, and a sponsoring organization; a project tracks its activity including logging when an artifact in the project is used or updated and the unique identity of the user that used or updated the artifact. Examples of projects include the Mozilla Foundation (sponsoring organization) which maintains the Firefox (project name) web browser, the Eclipse Foundation which maintains the M2Eclipse software, the Apache Software Foundation which maintains Maven, as well as private companies such as Sonatype that maintain their projects such as Sonatype Professional. A project can be a parent or child of another project, in which case the child can inherit group ID, version number, developers and contributors, plugin lists, report lists, plugin executions, and plugin configuration from the parent.

Software project developers face a problem of making sense of a giant jumble that is open source software. Finding artifacts that meet all their needs among this giant jumble of available artifacts can be difficult. Systems have been proposed that aid developers in initially determining a best-fit artifact given a developer's needs. Those systems, along with the embodiments disclosed herein, which are directed to ensuring that an in-use artifact continues to be appropriate and meet the developer's needs, are applicable to any field of software development.

Concerns of software developers in initially selecting and continuing to use artifacts can include the following questions: Functionality—does an artifact do, and will the artifact continue to do, more than other artifacts I have previously used? Does an artifact do, and will the artifact continue to do, exactly what I need it to do? Security—does the artifact perform, and will the artifact continue to perform, without being hacked? Applicability—does the artifact perform, and will the artifact continue to perform, for my intended audience? Is this artifact used, and will the artifact continue to be used, by my peers, i.e., other people in my industry. In this regard, peer usage indicates a higher degree of trust and applicability for the intended goal.

There are hundreds of thousands of artifacts from which a developer can choose. However, conventionally there is no available guidance, beyond mere traditional Web-based search engines (e.g., Google), for assisting a user in finding and maintaining an appropriate artifact. There are no techniques currently for scoring and/or ranking of artifacts, nor is there any standardized way of evaluating artifacts. There are no systematic sources of evaluations and/or recommendation related to what would be an appropriate artifact for a particular software development project. Further, once an artifact is initially determined to be appropriate, there are no techniques for ongoing monitoring of artifact characteristics to ensure that an artifact's ranking or scoring or overall characteristics remain consistent with the needs of the developer.

Some additional background related to artifact usage is now provided. Conventionally, the process of building an executable computer program from software artifacts can be managed by a build tool, which is a computer program that coordinates and controls other programs to compile and link the various files which together comprise the executable computer program, in the correct order. A build tool can include preprocessing, compilation, linking, packaging, testing, and ultimate distribution of the executable computer program.

A build management tool can provide a superset of features found in a build tool, and can facilitate communication among members of a working team. Examples of build management tools include Maven available from Sonatype Inc. or Apache Software Foundation ("Apache"), Apache Ant available from Apache, Buildr available from Apache, Gradle available from Gradle Inc., Apache Ivy, and the like, variations and evolutions thereof. It is assumed that one of skill in this field is generally familiar with "Maven: The Complete Reference" (2010) published by Sonatype, Inc. Mountain View, Calif. which further describes some basic concepts.

As mentioned above, proposals have been put forward that advantageously help developers that are writing their own software obtain evaluations and recommendations as to which artifact or artifacts would be appropriate for each particular developer and for each particular project for that developer. As further discussed herein below, various inventive principles and combinations thereof are advantageously employed to further aid the software developer in ensuring that a selected and in-use artifact continues to be appropriate for each particular developer and for each particular project of that developer.

In accordance with exemplary embodiments, systems and methods are provided for, after predetermined criteria have been applied in objectively rating and scoring candidate artifacts based on quality, industry, community standards compliance, and/or other user-defined criteria, communicating with a central server maintaining information related to the scored and/or rated artifacts to ensure that the artifact continues to meet the necessary ratings and scoring of the artifact user. In an exemplary embodiment, the actual mechanism for communicating with the central server is the operation of a plug-in in the software development environment utilizing the artifact. The plug-in will, irrespective of which exact software development is being used, and either at regular time intervals or at certain triggering events, cause the client to poll the central server related to whether there any changes to the artifact itself, or to the rating or scoring of the artifact, that are outside of either a user defined or system defined significance threshold.

If the server determines that such an actionable change exists related to the in-use artifact, the server will communicate this determination to the client. The plug-in and the software development environment operating on the client will then undertake an update action in response to the determination of an actionable change. An exemplary update action might include providing a notification of the actionable change, and blocking further use of the artifact in the software development environment until an indication acknowledging awareness of the actionable change is received by the client computer from the artifact user.

Before providing a more detailed discussion of the exemplary embodiments related to ensuring the ongoing suitability of an in-use artifact, a discussion of how an initial determination of appropriateness of the artifact is now provided. Such a determination begins when predetermined criteria are applied so as to objectively score candidate artifacts based on quality, industry, community standards compliance, etc. A mechanism exists for applying such criteria, and it is a machine-driven ingestion of metadata related to the candidate artifacts that is obtained from repository and known projects. Metadata that is associated with the candidate artifacts about the activity of the respective projects to which the artifacts belongs can be collected, along with security associated with each artifact, or licensing associated with each artifact. The scoring of the candidate artifacts is then based on the collected metadata.

Once candidate artifacts have been objectively scored or rated (that it to say, without regard to any characteristics of the user), the candidate artifacts can then be compared for suitability with an intended use of the artifact by the user. In this manner, candidate artifacts can be subjectively scaled and/or scored with specific reference to a user. Once candidate artifacts have been subjectively scaled or scored, a best-fit artifact can be selected by, or recommended to, a user.

In summary, an initial determination of an appropriate artifact for a user may include performing an objective evaluation of candidate artifacts according to predefined criteria that results in a first score for each candidate artifact. Then a subjective evaluation of the candidate artifacts in view of the intended user, and in view of the intended use of a selected artifact, will result in a scaled score being applied to each candidate artifact. Selection of an appropriate artifact is then made based on the scaled scores.

Figure 5:
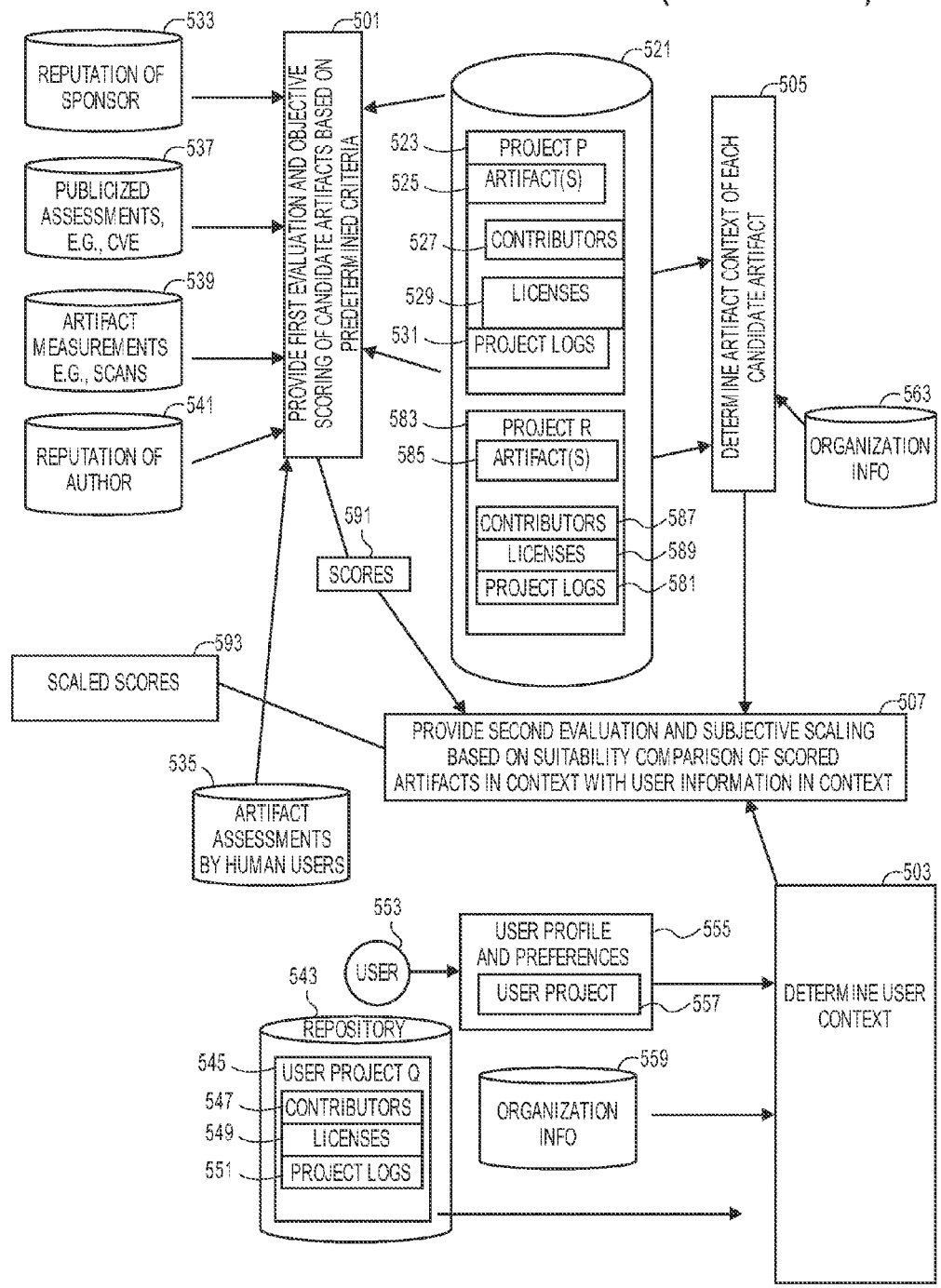
FIG. 5 is a data flow diagram illustrating a related art system for scoring and/or rating one or more artifacts.

Referring now to FIG. 5, a data flow diagram illustrating a related art system for scoring and/or rating one or more artifacts is discussed and described. It should be expressly noted that FIG. 5 is RELATED art and not PRIOR art. FIG. 5 is similar to novel systems and methods described in related U.S. patent application Ser. No. 13/151,816 (now U.S. Pat. No. 8,612,936).

In overview, FIG. 5 illustrates that data flows into a process to provide 501 a first evaluation and objective scoring of candidate artifacts based on predetermined criteria; data flows into a process to determine 503 user context from a user project, user profile, and user organization information, and the like; data flows into a process to determine 505 an artifact context for each candidate artifact from each candidate artifact's project, organization information, evaluator's organization information, and the like. Data also flows from determination 503 of a user context, determination 505 of each candidate artifact's context, to provide 507 a second evaluation and subjective scaling based on a suitability comparison of scored artifacts in context with user information in context. The scaled scores 593 thus reflect that scores 591 obtained from the objective evaluations 501 are scaled by the suitability comparisons 507, given the intended user and intended uses of a desired artifact. Because the generated scaled scores 593 take into account the user's subjective intended use (as input by the user and/or as determined by automated selection of information specifically relevant to the user's project), an artifact with a higher score reliably will be more appropriate for incorporation into the user's project than artifacts with a lower score. Once scaled scores 593 are obtained, an artifact can then be selected either by a user or by the system based on a best fit.

Illustrated in FIG. 5 are a repository 521 with Project P 523 and Project R 583, a reputation of sponsor database 533, one or more artifact assessments by humans databases 535, 535, a publicized assessments database 537, an artifact measurements database 539, and a reputation of author database 541. The projects 523, 583 includes one or more artifacts 525, 585, lists of contributors 527, 587 of the artifacts, associated license(s) 529, 589 to which the artifacts in the projects are subject, and project logs 531, 581. The project logs 531, 581 can track, for example, source code controls (e.g., log in, check-in, check-out, update, etc.) and/or project issue tracking logs, as is known in the art.

Also illustrated in FIG. 5 are a user 553, who provides information comprising a user profile 555 with preferences of the user, and one or more organization information databases 559. The user profile 555 can include an indication 557 of a user project. In this example, the user project indication 557 relates to user project Q 545. In FIG. 5, repository 543 includes the user project Q 545 that contains indicators of the contributors 547 to the project 545, licenses 549 associated with the project 545, and project logs 551.

As mentioned above, a software developer, such as user 553, wants to be able to use software artifacts that someone else has made publicly available, such as in one or more repositories 521 including one or more projects 523, 583. If the artifacts are open source, they are conventionally free to use. The developer wants to determine which of the artifacts of a particular type they want to use based on objective information about the quality of that artifact as well as other subjective information such as who else might be using that artifact in their same industry or similar types of industry. "Similar type of industry" considerations may be a subjective measure of the value of a candidate artifact.

As an example of "similar type of industry" consideration, a user who is a software developer in banking may want to know if someone else in banking or finance uses an artifact under consideration. As another example, a developer of a Fortune 1000 company wants to know whether other Fortune 1000 companies use the same module. As another example of a "similar type of industry" consideration, a developer in a regulated industry such as pharmaceuticals will be interested whether other developers in an industry under the same type of regulations are using the artifact. An artifact previously used by software developers in a similar industry or working in a similar type of company will give the user more confidence that an artifact is suitable if the same artifact has been used by an unknown start-up company or a different type of company or in a different industry.

Other subjective consideration in selecting a software artifact can be compliance with other user-defined criteria. For example, a developer may indicate that they only want to use artifacts that are widely used in their same geography (e.g., Europe or Germany; or in the U.S. or Mexico), or to only use artifacts that get a certain quality score level from user reviews, e.g., 3 or 4 star or better. It should be noted that user reviews of quality may be considered an objective evaluation of an artifact (that is an evaluation unrelated to a particular user); however when particular levels of quality are indicated as a preference of a user, user reviews can also be a subjective evaluation tool.

Furthermore, a user may want to have some other set of metrics they can use to subjectively score of an artifact so the user can decide whether or not they want to use that artifact. For example, a particular artifact may be understood to have few security issues, and may be considered to be of good quality, a developer working on an extremely sensitive application, such as an air safety application will need an artifact that is characterized by exceptionally high security and exceptionally high quality.

Generally speaking, quality of an artifact is an objective consideration in an evaluation of an artifact. Quality of an artifact can be measured, for example, based on other users' feedback, reported bugs, compatibility with prior versions, and an inferred level of quality based on the number of committers. Of course there are other objective indicators useful in scoring an artifact, and these are now discussed.

In overview, metadata that is used to objectively score artifacts, and that is utilized in the dataflow diagram of FIG. 5, can be divided into three categories: (1) derived data, (2) community/contributed data, and (3) third party data. Derived data is data which is collected about activity of the artifacts. Derived data can be, for example, conventional logs of which artifacts are downloaded from the project to users. These logs 531, 581 in the projects 523, 5183 can be analyzed to determine, for example, how frequently the artifact is downloaded, to what geographic regions the artifact is downloaded (using a known technique), to what company the artifact is being downloaded to (by performing known reverse DNS lookups to figure out the actual companies who are doing the downloading and from that, determine their industry and size from an automatically or manually produced list or from organization information 559, 563).

As a concrete example of derived data, project activity may be directly derived or inferred from the source code control mechanism (SCM) associated with the project as well as the issue tracking systems that may be associated with the project. Also, projects conventionally collect information on how frequently an artifact is updated (reflected in the project logs 531, 581), who the committers are who contributed the artifact (as listed in the contributors 527, 587), and what else the committers have contributed (obtained by reviewing contributors 527, 587 lists in other projects). As is known in the art, a committer typically digitally signs the contributed artifact so that the contributors' 527, 587 information is highly reliable.

Community/contributed data can include, for example, reviews, scores, ranking, categorization, and tagging. This type of data may be provided by users, for example, as artifact assessments by human users 535. An example of a similar type of assessment in a slightly different environment would be a review process provided by, for example, Amazon.com, Netflix.com, and other web sites where products/services are assessed. Even more complex associations can be discovered from analysis of contributed data such as, "users who use artifact X tend to use artifact Y."

Third party data can be information pulled in from other sources and can be approximately matched to artifacts or information in the project about the artifacts. For example, data on artifact licenses can be obtained from a company that provides that type of information based on the licenses 529, 589 associated with the artifacts. Data on security of the artifact can be obtained from NIST security bulletins. Vulnerability information and quality information can be obtained from the project logs 531, 581 themselves. In FIG. 5, the third party data is represented as publicized assessments, e.g., CVE 537 (common vulnerabilities and exposures information conventionally available from Mitre Corporation).

Typically there is not a one-to-one correspondence between the third party data and a particular artifact. Since the convention of project group/artifact/version is used for the convenience of programmers and is generally not known to persons that ultimately use the final software product, the third party data does not refer to the project group/artifact/version. Therefore, the identity of the artifact or artifacts to which the third party data actually is relevant must be resolved (manually or by developing and referring to a list) against the identity of the software indicated in the third party data. For example, if the artifact comes from project FOO, the artifact name and number must be reconciled against the logs for that artifact name and number at project FOO.

The process to provide 501 a first evaluation and objective scoring of candidate artifacts based on predetermined criteria can obtain derived data about the artifacts 525, 585 from the names of contributors 527, 587 of the artifacts, licenses 529, 589 of the projects 523, 583, and project logs 531, 581 which indicate how often and how recently the artifact is updated. The process 501 can input community/contributed data, such as the artifact assessments by human users 535 indicating assessment by the human users. The process 501 can also input third party data such as publicized evaluations, e.g., a CVE 537, and can resolve the third party data software name and release (e.g., Microsoft 2007 1.0) to the project group/artifact/version. Optionally, the reputations of the contributor organization sponsor 533 and author 541 (such as determined by user reviews or as indicated by critics in trade journals) can be further input into the process 501. This information can be collectively evaluated to provide an objective score. Again, the score is referred to as objective because it is made without considering the user or the intended use. Various techniques are known for collecting rankings and evaluations, weighting the information, increasing/decreasing weightings and the like, and any desired technique can be used herein.

The process to determine 503 the user context may use the user profile 555 that is obtained from the user 553. The process 503 will also use the user project Q 545, and user organization information 559 and the like to further develop the context of the user. As described further below, the user profile 555 may be input from the user to determine their subject preferences for candidate artifacts, such as how recently used an artifact should be, minimum or maximum frequency of downloading and/or updating of an artifact, preferred contributors of an artifact, preferred sponsors of an artifact, standards for reputation of sponsor or author, minimum or maximum versions of an artifact, preferred licenses for an artifact, unacceptable licenses for an artifact, source code language, geographic requirements, industry requirements, security requirements, and the like. The user profile will preferably indicate the user project 557, which points to a particular user project Q 545, from which are obtained the contributors 547 and licenses 549. Any artifacts eventually selected by the user from the recommended artifacts provided to the user will also become part of user project Q 545.

The organization of the user can be obtained via input from the user through the user profile or from the user's e-mail address, IP address, and/or from the sponsor as reflected in the user project Q 545. Once the user's organization is known, information about the user's organization can be obtained from the organization information 559, such as geographic location, organization size, organization industry, organization regulations, public/private organization, and the like. Of course, the user can additionally provide this information via the user profile 555 as well.

The process to determine 505 a candidate artifact context for each candidate artifact may use information from the artifacts' project 523, 583; the artifacts' contributors 527, 587; the licenses 529, 589 of the projects 523, 583; the projects' logs 531, 581 of the artifacts' projects 521, 581; the artifacts' projects' organization information 563, the artifacts' contributors' organization information 563; and (although not indicated in FIG. 5 by directional arrows) any of the reputation of sponsors 533, publicized assessments 537, reputations of artifacts' evaluator and authors 541, and artifacts' measurements 539 that may be relevant to obtaining the context of each of the candidate artifacts 525, 585. It should be noted that data related to the candidate artifacts' organizations may be obtained as explained above from the contributors' e-mail addresses, IP addresses, and/or from the sponsors as reflected in the artifacts' projects 523, 583. Then, information about the artifacts' sponsors' and/or contributors' organizations can also be further obtained from the organization information 563, including data such as geographic location, organization size, organization industry, organization regulations, public/private organization, and the like.

The information from the determination of user context 503 and the determination of artifacts' contexts 505 may be used for providing 507 a second evaluation and subjective scaling of the scores of the artifacts based on a suitability comparison of the artifacts in context with user information in context. For example, the objective score of an artifact 525, 585 which has the same or overlapping context (e.g., for the artifact's project 523, a same or overlapping organization, geographic location, organization size, organization industry, organization regulations, public/private organization, and the like) as the user's project and/or provided preferences will be scaled upward. As another example, the score of an artifact that has been assessed 535 by a contributor with a same context (e.g., for the contributor assessing the artifact, a same or overlapping organization, geographic location, organization size, organization industry, organization regulations, public/private organization, and the like) as the user's project and/or preferences will also be scaled upward. Also, the objective score of an artifact 525, 585 which meets the user's preferences from the user's profile 555 as to frequency of use/update; how recently used/updated; minimum or maximum frequency of downloading and/or updating of an artifact (all as determined from the artifact's project's project log 531, 581); contributors of an artifact 527, 587; preferred sponsors of an artifact (as determined from the project 523, 583 information); standards for reputation of sponsor or author (as determined from the sponsor/author by reference to the reputation of sponsor/author 533, 541); minimum or maximum versions of an artifact (as determined from the project version ID); preferred or unacceptable licenses for an artifact (as determined from the project's license 529, 589); source code language (as determined from the project 523, 583 information); geographic requirements (as determined from the project's sponsor/contributor with reference to the organization information 563); and the like, can also be scaled upwardly in a degree that may vary depending on the nature and number of common features.

The objective scoring 501 and the subjective suitability comparison 507 are combined to provide scaled scores 593. The scaled scores 593 can then be used in any number of ways to determine which artifact or artifacts should be utilized by a software developer. An artifact can be selected by a user based on the scaled scores, or can be assigned to a user by the system using known selection techniques.

Begin—Second Set Definitions

A few additional definitions of claim terms can now be provided in view of the above discussion. Initially, as seen above the scoring and/or rating of an artifact is based on both subjective criteria (for example, a comparison of a user context and an artifact context) and on objective criteria (for example, statistics related to known security vulnerabilities).

Therefore as used herein, the term "artifact characteristic" is defined as any artifact property that is represented as a quantitative measurement.

Further as used herein, the term "artifact preference" is defined as a quantitative measurement of a level of significance of an artifact characteristic, established by a user or established by a system using known techniques, of an artifact.

As used herein, the phrase "actionable change to the software artifact with respect to the artifact preferences" is defined as a change in an artifact characteristic to above or below the artifact preference associated with the artifact characteristic.

As used herein, the term "update action" is defined as a specific action, either previously established or dynamically determined, in response to a specific actionable change.

End—Second Set Definitions

As maybe gleaned from the description and illustration of FIG. 5, processes 501, 503, 505, 507 will be implemented by a computer, and all the data related to the data flows must be stored. Specifically, the data related to providing 501 objective scoring, determining 503 the user context, determining 505 each artifact context, and providing 507 a subjective scaling must be stored. All of this data as well as the programming instructions may be stored in a central server that is accessible to various users of artifacts.

The herein claimed embodiments will make use of the data stored in the central server. Specifically, the data used in the process 501, 503, 505, and 507 may also be further used in determining whether an in-use artifact remains suitable for a user. More generally, artifact properties that are quantifiable, i.e. artifact characteristics, can be stored in the central server, including objective data relating to, for example, quality, licensing, security, and many others, as well as data related to those properties that are used in subjective scoring, such as user industry, user quality requirements, preferred sponsors, and others. The specific preferences of users as to artifacts may also be stored in the central server. That is to say, as the scoring and scaling processes of FIG. 5 are executed, quantitative measurements of the level of significance of an artifact's characteristics are obtained by the system using known derivation techniques or through interactions with the user. Lastly, the central server may store data indicating a necessary change in the value of an artifact characteristic, i.e., an actionable change, such that the user of the artifact would be notified of the change in order to consider what options might be taken with respect to the artifact. Data indicating an actionable change can be obtained through known derivation techniques Given all of the above background related to scoring artifacts in order to aid in the selection of a particular artifact to be used in a particular software development environment, and given the above background related to storing data that may be used in the scoring process, focus can now be placed on how changes to the in-use artifact, or even changes in the criteria by which the characteristics of the in-use artifact are measured, effect the continued suitability of the in-use artifact with respect to the particular software development environment. Specifically referring now to FIG. 1, a diagram illustrating the structure of an exemplary artifact update notification system with a client/server architecture is discussed and described. In overview FIG. 1 illustrates an update notification system that includes six client devices 103, 105, 111, 113, 115, 121, each with a software development environment operating thereon, and a single central server 101. As indicated in the figure, the server 101 stores artifact preferences of artifact characteristics. Although not labeled, the server 101 also stores data related to the objective and subjective criteria upon which artifact scoring is based, as well as actionable change data. In short, the server 101 stores all the data related to the data flows of FIG. 5. The server is in bidirectional communication with each client device 103, 105, 111, 113, 115, 121. In addition, even though it is not shown each client device may also be in bidirectional communication with the other client devices.

Client device 103 and 113 both operate with an integrated development environment (IDE) in use. For example, client device 103 operates with IDE application "A", and client device 113 operates with IDE application "B". In summary, an IDE is a software application that provides comprehensive facilities to aid in computer programming by software developers.

An IDE normally consists of a source code editor, a compiler and/or an interpreter, build automation tools, and a debugger. IDEs are designed to maximize programmer productivity by providing tightly-knit components with similar user interfaces. Typically an IDE is dedicated to a specific programming language, allowing a feature set that most closely matches the programming paradigms of the language. However, there are some multiple-language IDEs, such as Eclipse, ActiveState Komodo, IntelliJ IDEA, Oracle Developer, recent versions of NetBeans, Microsoft Visual Studio, Genuitec MyEclipse, WinDev, and Xcode.

IDEs typically present a single program in which all development is done. As indicated above, the IDE typically provides many features for authoring, modifying, compiling, deploying and debugging software. The aim is to abstract the configuration necessary to piece together command line utilities in a cohesive unit, which theoretically reduces the time to learn a language, and increases developer productivity. It is also thought that the tight integration of development tasks can further increase productivity.

Figure 6:
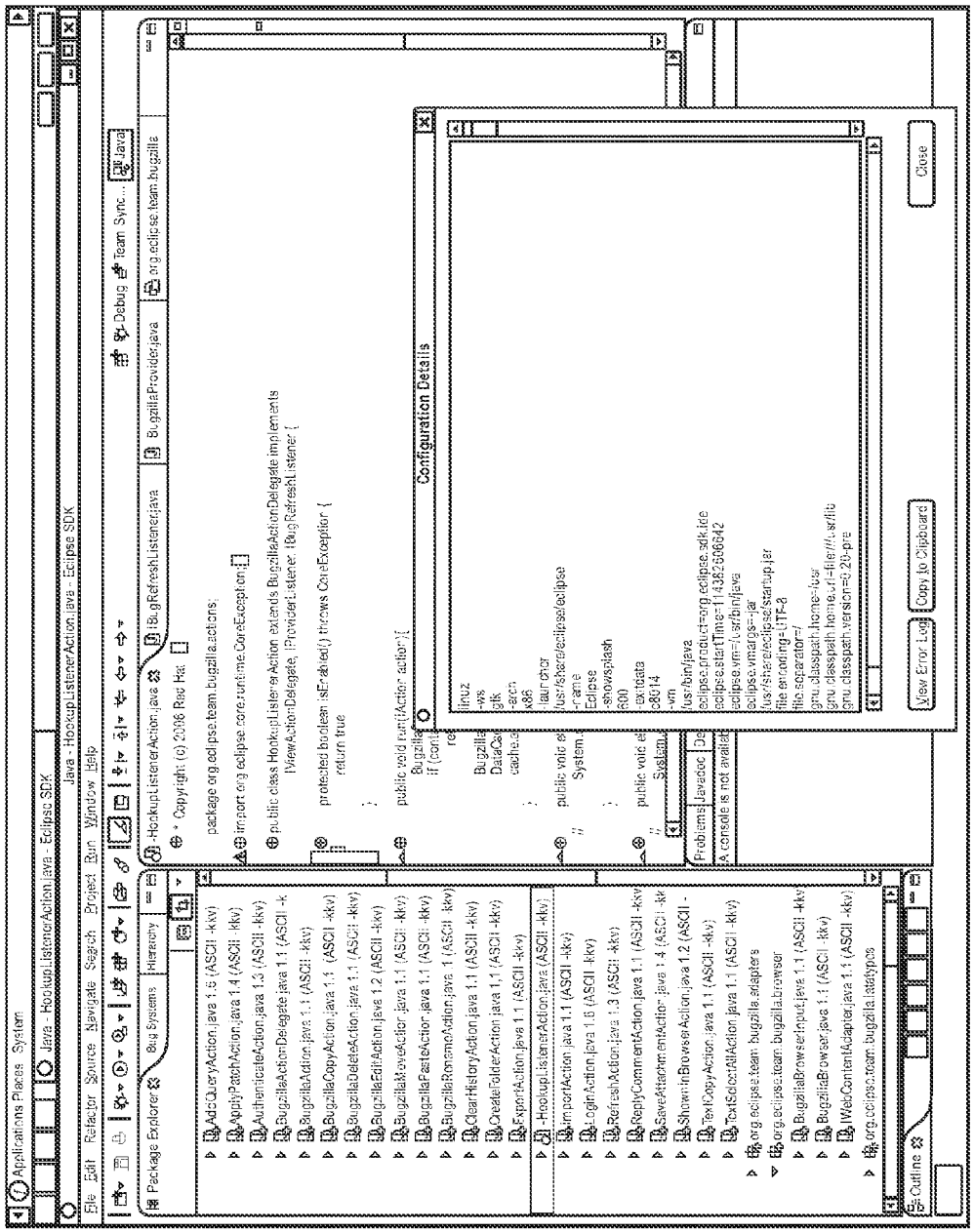
FIG. 6 is a screen shot of an exemplary integrated development environment ("IDE") type software development environment.

FIG. 6 is a screen shot of the Eclipse IDE, and is presented as a simple example of a well-known IDE. It should be noted that it is well known in the art how artifacts are used in an IDE by integrating previously tested and published code. Therefore these details are not presented herein.

In FIG. 1, client devices 111 and 121 both operate with continuous integration systems (CI) in use. For example, client device 111 operates with CI application "D", and client device 121 operates with CI application "C". In summary, a CI implements continuous processes of applying quality control in a software development environment by frequently integrating a developer's new or changed code with an existing code repository Prior to the development of CIs, developers working on a multi-person task would each write code, and then at periodically scheduled times, the total sum of code by all programmers was compiled and run. With a CI, however, the system operates to continuously integrate newly written code from all the programmers, each time compiling, running, and testing all the code in the task to ensure compatibility of the newly written code.

CIs operated on the principle of continuously running the life cycle. If some newly written code breaks any part of the task or doesn't work right, it immediately alerts the developer who wrote the offending code. Stated another way, as a soon as a programmer is satisfied with a portion of code, the CI builds the source code control system with the newly added code. In older systems, programmers on a task might not test code until it was more completely flushed out. However, in a CI, the server will operate on something that is as small as a one line fix. For example, if a typo is recognized, the CI runs all the tests, and either passes or fails the code.

The global adoption of CIs is now fairly standard, as CIs have a high level of efficiency. Additionally, CIs are transparent about the effects of newly integrated code. In summary, CIs are very useful with respect to agile development methodologies where programmers are releasing code in smaller chunks, and releasing them more often. Under these circumstances, a CI is almost necessary, as compared with the traditional waterfall development paradigm.

It should be noted that in FIG. 1, the computers 111, 121 configured with a CI operating thereon are referred to as clients. This is due to the fact that these computers are clients with respect to the artifact data stored in, and artifact processing performed in, the central server 101. CIs are commonly installed on a CI server that is in a server/client relationship with the multiple client devices upon which programmers do their work. This subtlety is not reflected in FIG. 1.

Figure 7:
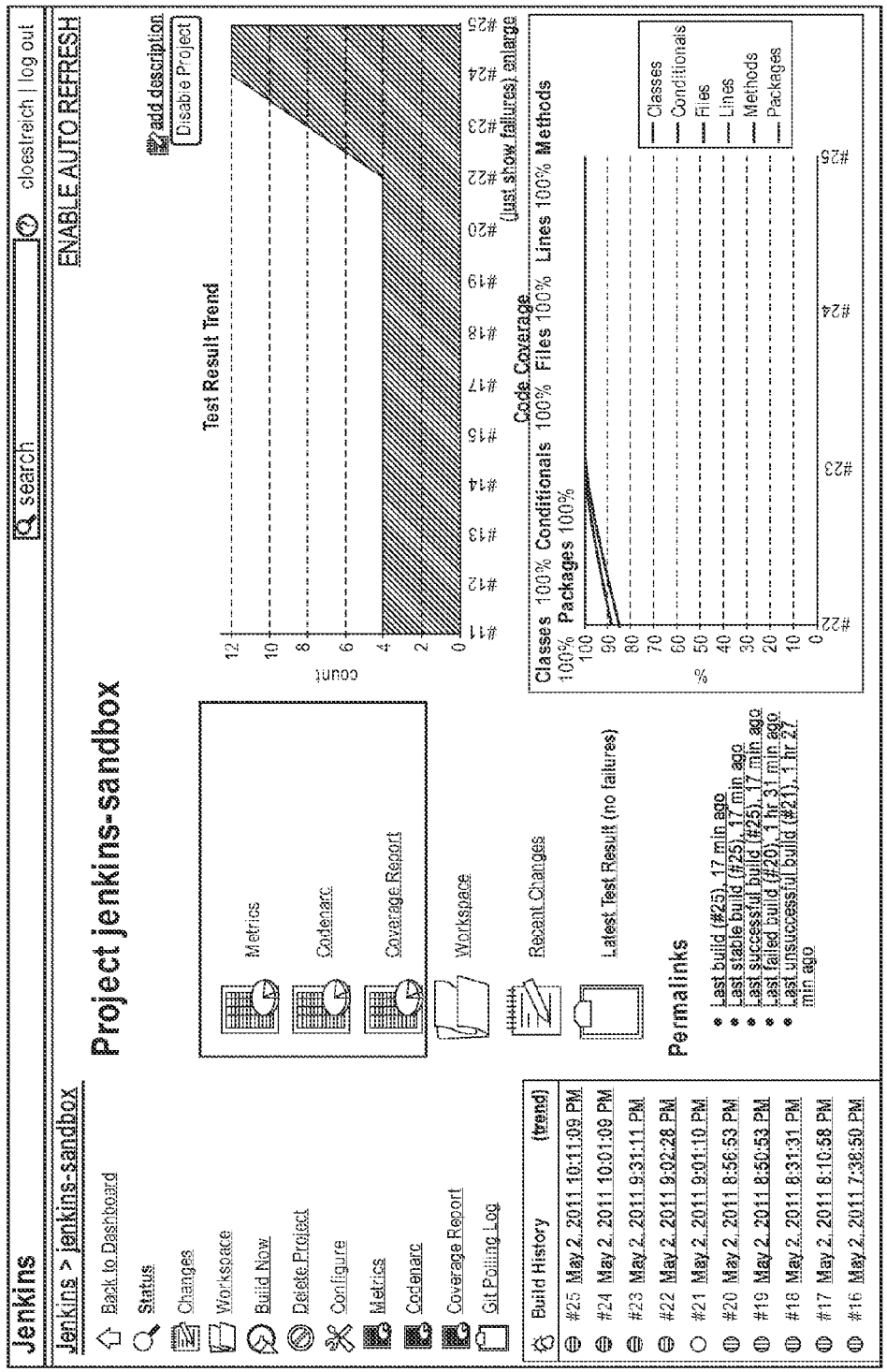
FIG. 7 is a screen shot of an exemplary continuous integration system ("CI") type software development environment.

Examples of CIs include Hudson, Jenkins, AnthillPro, Apache Continuum, Bamboo, and many others. FIG. 7 is a screen shot of the JENKINS CI, and is presented as a simple example of a fairly well-known CI. It should be noted that the ordinary practitioner in the art is knowledgeable as to how artifacts are integrated into the source code of a task being developed with a CI. Therefore these details are not presented herein.

Client device 105 and 115 both operate with repositories operating thereon. For example, client device 115 operates with repository "E", which maintains $3^{rd}$ Project 117 and $4^{th}$ Project 119, and client device 105 operates with repository "F", which maintains $1^{st}$ Project 107 and $2^{nd}$ Project 109. As opposed to an IDE and a CI, a repository represents an actual machine where projects and their corresponding artifacts are actually managed and developed.

To further clarify, a repository is essentially an electronic storage system that stores software build artifacts and dependencies for later retrieval and is the location where artifacts are published in accordance with procedures which are well known to those in the field. Artifacts made by one software developer are published to be available for further use by other software developers, and to be incorporated as building blocks to build software products which can be executed.

Similar to a CI, a repository itself is often referred to as server by which the stored electronic copies of artifacts are made available for use by software developers to be incorporated as building blocks to build software products which can be executed. The repository has a unique identifier that indicates the software developer (an individual or a group) that contributed the artifact. In a sense, anybody who has access to a web server and can put files in a specific place can run a repository. The repository, however, is more than just a passive device.

There is a class of software called repository manager which allows an enterprise or organization to manage the contents of their repository; whether it's the formal publication of artifacts in the repository, whether it's the gating of that repository so that only certain artifacts get in or out, or whether it's just formalizing the integration of that repository with other tools like the build server or the source code server. A repository manager needs to be aware of all the changes being made to particular artifacts by public developers, and the enterprise must then decide whether the changes can officially be made part of the published artifact.

Thus even though the process flows of FIG. 5 do not necessarily indicate so, a repository manager must also establish preferences related to the artifacts stored therein. For example, if objective criteria related to a published artifact, such as a security vulnerability or artifact quality, change significantly enough to be actionable, the repository manager may take an update action which would be to temporarily ban further distribution of the artifact or to include a particular warning related to the artifact. Thus an organization can also indicate artifact preferences in a manner similar to those illustrated in FIG. 5 and described above.

Figure 8:
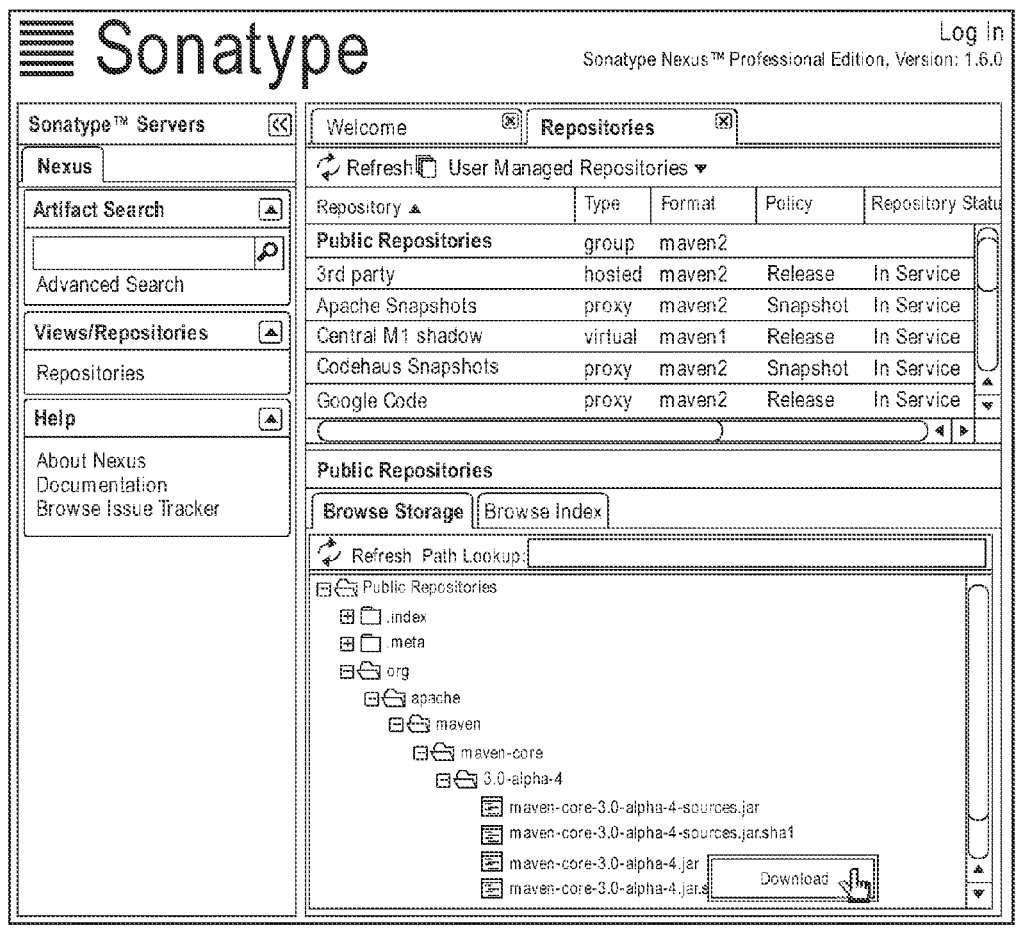
FIG. 8 is a screen shot of an exemplary repository management type software development environment.

A few well known examples of repository managers include Nexus (formerly Proximity), Artifactory, and Apache Archiva. FIG. 8 is a screen shot of the NEXUS repository manager, and is presented as a simple example of a well-known repository manager. The repository manager provides management functions of artifact stored therein in the manner described in detail above.

Figure 2:
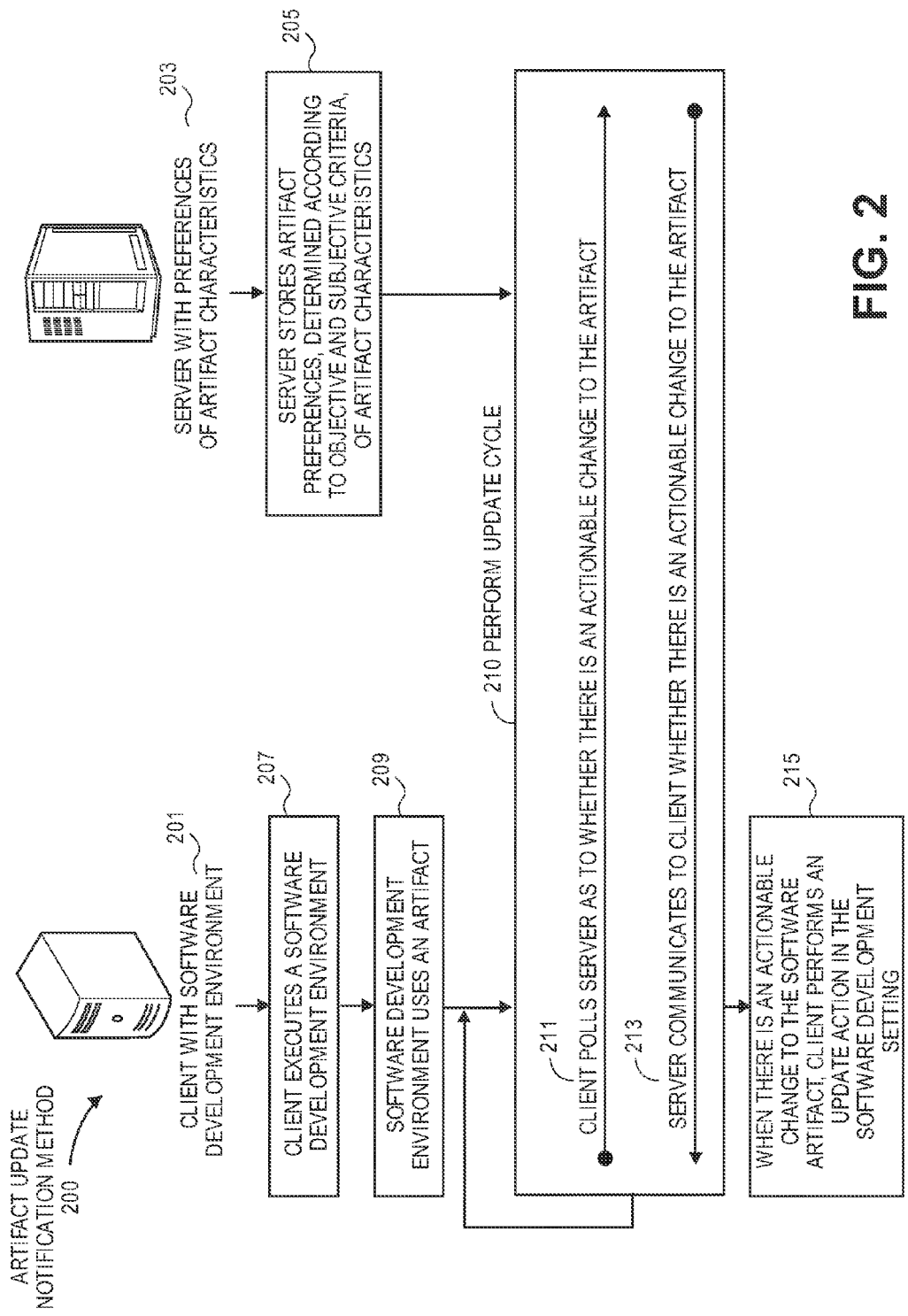
FIG. 2 is a diagram illustrating an exemplary artifact update notification method in a client/server architecture.

Referring now to FIG. 2, a diagram illustrating an exemplary artifact update notification method 200 in a client/server architecture is discussed and described. It should initially be noted that the processes related to the client 201 appear on the left side of the drawing, and the processes related to the server 203 appear on the right side of the drawing. The processes of the client 201 and server 203 execute independently other than one particular repeated transaction described below.

At 207, the client 201 executes a software development environment. That is to say, an IDE, a CI or a repository manager will run on the client 201. It should be noted that although the IDE, the CI, and the repository manager are provided as examples of software development environments, the herein claimed embodiments contemplate that further applications will be developed that will be useful in developing software. Thus a caveat is warranted that a software development environment as claimed herein is not limited to the three examples previously discussed.

As the client executes 207 the software development environment, the software development environment uses 209 an artifact. As described above, an IDE and/or CI will use the artifact as a programming tool, as is known in the art. A repository manager will perform a management function with respect to the artifact, determining how the artifact will be distributed, updated, secured, published, etc.

As indicated above, the central server 203 maintains preferences of artifact characteristics. These preferences may have been previously established by a user through interaction with the server 203. Such interactions are known in the art, and commonly include electronically completing a user profile or questionnaire. Preferences may also be established through techniques that derive preferences from analyzing data related to the user context 503 and the artifact context 505, as described above with respect to FIG. 5. Examples of preferences would include, as discussed above related to FIG. 5, that artifacts come from developers in a particular geographic regions; that the artifacts are used by developers in a particular industry; that artifact have certain security ratings; that previous use of an artifact exceed a particular threshold; that certain sponsors are involved in the project associated with the artifact; and clearly many, many, others. As would seem logical, user preferences related to artifacts can dynamically change.

At 205, the server 203 stores the artifact preferences, the preferences having been determined according to objective and subjective criteria of artifact characteristics.

Begin—Third Set Definitions

In order to clearly demonstrate the meaning of these expressions, additional definitions are now provided. The term "subjective," for example as used in the expressions "subjective evaluation", "subjective characteristics", "subjective qualities", and "subjective criteria" is defined herein as simply being related to a particular user. The term "objective", for example as used in the expressions "objective evaluation", "objective characteristics", "objective qualities", and "objective criteria" is defined herein as not being related to a particular user; that is, being independent of any particular user.

As used herein, the term "polling" is defined as actively sampling the status of an external device, namely the server, by a client.

End—Third Set Definitions

The server 203 storing 205 artifact preferences occurs independently from the client 201 executing 207 a software development environment that uses 209 an artifact. However, an update cycle is performed 210 between the client 201 and the server 203. The update cycle includes the client 201 polling the server 203 as to whether there is an actionable change to the artifact with respect to the artifact preferences. As indicated above, an actionable change in the artifact simply means a change in an artifact characteristic that is above or below a level of significance, i.e. an artifact preference, with respect to the artifact characteristic.

Examples of actionable changes might include a sudden increase in the number of uses of an artifact in a particular geographic region or in a particular industry; a discovery of a security vulnerability; changes in sponsors of the projects or authors of the artifact. An actionable change can occur with respect to any characteristic that was previously discussed with respect to FIG. 5 including those found the reputation of sponsor database 533, one or more artifact assessments by humans databases 535, 535, publicized assessments database 537, artifact measurements database 539, and reputation of author database 541. The characteristics subject to objective evaluation (such as those discussed above with to each artifact context 505 and to a user context 503) can also be the subject of an actionable change. However, it should be noted that an actionable change requires that the change to the artifact characteristic either exceed or fall below a threshold level of significance. That is to say, not every change is an actionable change.

As indicated above, an actionable change may be implemented numerically. For example, a random security characteristic of an artifact may be indicated as 9. Further, a preference of the security characteristic may have been indicated at 7 or above. A change occurs to the security characteristic of the artifact such that the security characteristic is now indicated as 6. Because the security characteristic is now below the associated preference (6<7), the change in the security characteristic is an actionable change. It should be noted that the above example is only a single possible implementation, and that other implementations within the skill of the ordinary practitioner are considered to be within the scope of the claimed embodiments.

The implementation of the polling by the client 201 of the server 203 is performed according to a plug-in that operational in the software development environment. As is well-known in the art, a plug-in is a set of software components that adds specific abilities to a larger software application. Plug-ins enable customizing the functionality of an application.

Thus the disclosed embodiments consider a plug-in for use in one or more IDE platforms, a plug-in for one or more CI servers, and a plug-in for one or more repository managers that will at certain points in the development life cycle, poll the central server 203 where the data used in rating and scoring various artifacts are stored, including preferences determined according to subjective and objective criteria.

Each plug-in can be written so that polling is performed at regular time intervals. By polling at regular time intervals, the software development environment ensures that actionable changes will eventually be determined. Polling would be performed, for example, every day or every hour, as new activity related to artifacts happens quite frequently.

As an alternative to polling at regular time intervals, polling can be performed when triggered by certain events. In some sense, event triggering is more sensible given a developer's work flow. That is to say, regular polling does consume resources whereas polling at particular triggers allows the user to customize what events are important enough to poll the central artifact server for possibly important updates.

It should be noted that the server 203 is continuously updating data related to the artifacts. That is to say, the flow of data in FIG. 5 is ongoing so that new users can score and rate artifacts. As described above, changes to the artifacts themselves and to how users evaluate and understand the artifact is ongoing. Thus in response to the polling by the client 201, the server 203 communicates 213 to the client whether there is an actionable change to the artifact in the software development environment. That is to say, if any change to the in-use artifact exceeds a threshold of significance, as set by a user or as derived by the system, the server will communicate that there has been an actionable change. The server 203 will further indicate the nature of the actionable change.

As has been previously described, an actionable change can relate to any artifact property that can be measured quantitatively according to objective or subjective criteria. One common property of an artifact that often leads to actionable change is the introduction of an updated version of the artifact itself or one of the artifact's dependencies. It is fairly clear that with respect to a new update or a new dependency, it is important to determine whether the included changes preserve the functionality for which the artifact was originally selected by the artifact user.

A second property that often relates to an actionable change is any change in security vulnerabilities of the software artifact. It goes without saying that a user would want to reevaluate the use of an artifact given almost any change, even minor, in the security vulnerability of an artifact. In the modern era, so much is at stake in commercial networks that security is almost always the most fundamental issue.

Turning back to the client polling 211, irrespective of whether the polling 211 is performed at regular time intervals or at triggering events, the update cycle 210 will almost always be repeated. Thus in FIG. 2, an arrow extends from the left side of the update cycle 210 back to itself, indicating that the process will be repeated. It should be noted that the update cycle always includes a communication between client 201 and server 203, so although the arrow is placed on the left side of update cycle 210, this should not be construed as that only the client 203 performing. Rather, the client 201 polls 211 the server 203, so the arrow representing repetition is placed on the left side of the update cycle 210.

It should be noted that in alternative embodiments, the update cycle can be initiated by the server 203. That is to say, the server 203 can push out communications to the various clients 201 as to actionable changes in the artifacts stored on the server. However, the alternative embodiment is generally considered resource inefficient as the server must continuously push notifications of actionable changes to the client 203 whether they are desired by the client 203. In this alternative embodiment, processing would be reverse engineered from what has heretofore been described. However, an alternative embodiment where the update cycle is initiated by the server 203 would be well within the skill of the ordinary practitioner in the art.

Whether the client 201 pulls notification of an actionable change from the server 203, or whether the server 203 pushes the actionable change to the client 201, once the actionable change is received, the client 201 performs 215 an update action. As described above, an update action simply means a specific action, either previously established or dynamically determined, that is taken in response to a specific actionable change. Thus depending on the nature of the actionable change, a certain response is undertaken.

Examples of possible update actions include the client computer causing the software development environment to simply provide a notification of the actionable change to a user. The client computer could take the additional step of blocking use of the related artifact until the user acknowledges that he has received notification of the actionable change, but stills wants to continue to use the artifact. The above two update actions are often referred to as "alert and block" or "notify and block". Another update action may include replacing the artifact with a known update or dependency. A further update action may simply to initiate a data flow process of FIG. 5 again to determine an entirely new artifact to use.

As described, the particular update action taken is responsive to a specific actionable change. An association table or list may be stored at the client 201 that associates particular update actions with specific actionable changes. Such an association table or list is also referred to herein as a rules engine.

It should be noted that a particular update action taken by a client 201 may depend on what type of software development environment is operating on the client 201. Thus, an update action taken may depend whether an IDE, CI, or repository manager is operating on the client 201. Thus in some sense, a rules engine associates particular update actions with particular actionable changes and with particular software development environments.

A rules engine can improve efficiency as it may remove the need for a user to interact with the client 201 when an actionable change is received from the server 203 by the client 201. Establishing such a rules engine is easily done through a query interaction with a user. Alternatively, a rules engine can be derived based on observed user activity and/or based on user data. Establishing a rules engine is a process that is well known to the ordinary practitioner, and it is not further described nor illustrated.

An example of the method illustrated in FIG. 2 is now provided. A CI as part of its regular course of events or usage, will check new code out of the source code control system, build that code, run the unit tests, and report on the results. A plug-in in the CI will check against a centralized server that stores and updates the results of the data flow diagram of FIG. 5. Before the CI builds any new code, if it finds that a dependency has been introduced into the build and now has a security vulnerability, it will alert the user as to the actionable change.

In the above example, the CI may choose to block the build as an update action because something has been discovered about the artifact that results in a risk to the user. Alternatively, a rules engine may have been previously established such that a particular update action is automatically undertaken. Irrespective, the artifact update notification method described in FIG. 2 ensures that an artifact originally selected for a particular user continues to be suitable for that user.

Figure 3:
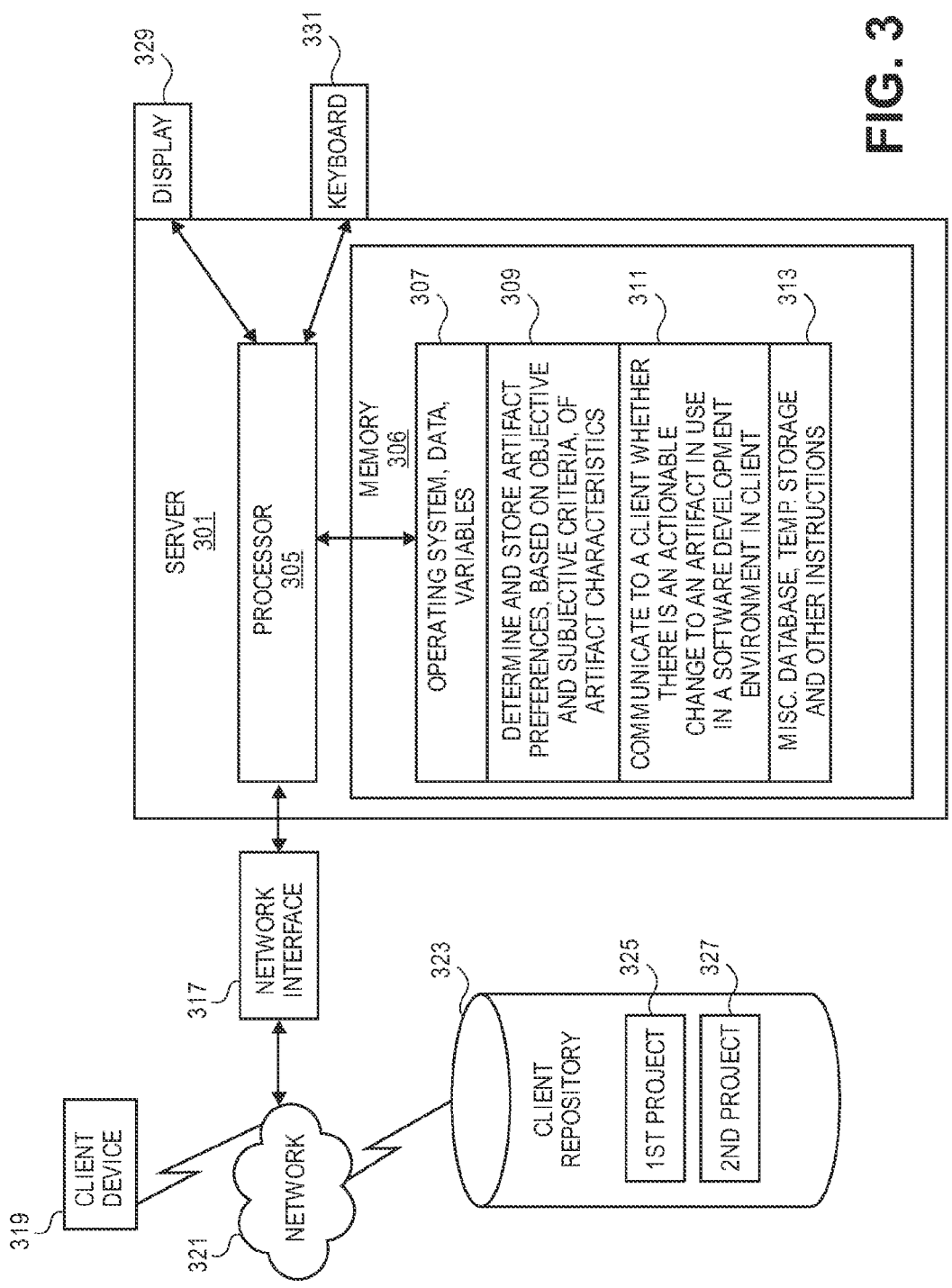
FIG. 3 is a block diagram illustrating an exemplary server in an artifact update notification system.

Referring now to FIG. 3, a block diagram illustrating an exemplary server in artifact update notification system is discussed and described. The server 301 may include one or more controllers 303, a processor 305, a network interface 317 for communication with a network 321, a memory 306, a display 329 (optional), and/or a user input device such as a keyboard 331. Alternatively, or in addition to the keyboard 331, a user input device may comprise one or more of various known input devices, such as a keypad, a computer mouse, a touchpad, a touch screen, a trackball, and/or a keyboard. The display 329 may present information to the user by way of a conventional liquid crystal display (LCD) or other visual display, and/or by way of a conventional audible device (e.g., a speaker) for playing out audible messages.

The processor 305 may comprise one or more microprocessors and/or one or more digital signal processors. The memory 306 may be coupled to the processor 305 and may comprise a read-only memory (ROM), a random-access memory (RAM), a programmable ROM (PROM), and/or an electrically erasable read-only memory (EEPROM). The memory 306 may include multiple memory locations for storing, among other things, an operating system, data and variables 307 for programs executed by the processor 305; computer programs for causing the processor to operate in connection with various functions such as: determine and store 309 artifact preferences, based on objective and subjective criteria, of artifact characteristics; and communicate 311 to a client whether there is an actionable change to an artifact in use in a software development environment in the client. In addition, and although not illustrated, the programs may include communicating to the client the nature of the actionable change. Besides the functions discussed above, the memory 306 can include other miscellaneous information in a miscellaneous database 313, along with the usual temporary storage and other instructions for other programs not considered herein.

Responsive to manual signaling from the user input device represented by the keyboard 331, and/or responsive to an automated signaling from a management program stored in the database 313, the processor 305 may direct the execution of the stored program related to determining and storing 309 artifact preferences. The nature of how such a stored program is carried out has been detailed above with respect to the artifact update notification system of FIG. 1 and the artifact update notification method of FIG. 2, each with reference to the related art data flows presented in FIG. 5. As such these details are not herein again described.

Responsive to manual signaling from the user input device represented by the keyboard 331, and/or responsive to an automated signaling from a management program stored in the database 313, and/or further responsive to polling received through the network interface 317, transmitted over the network 321 from either the client device 319 (possibly an IDE or CI) or the client repository 323, the processor 305 may direct the execution of the stored program related to communicating 311 to the client as to whether there is an actionable change to an artifact in use in a software development environment in the client. The nature of how such a stored program is carried out has been detailed above with respect to the artifact update notification system of FIG. 1 and the artifact update notification method of FIG. 2, each with reference to the related art data flows presented in FIG. 5. As such these details are not herein again described.

As mentioned above, the user input device may comprise one or more of various known input devices, such as the illustrated keyboard 331 and/or a pointing device, such as a mouse. The keyboard 331 may be supplemented or replaced with a scanner, card reader, or other data input device; and the pointing device may be a mouse, touch pad control device, track ball device, or any other type of pointing device. The display 329 is representative of a display that may present information to the user by way of a conventional liquid crystal display (LCD) or other visual display, and/or by way of a conventional audible device for playing out audible messages.

The server 301 can access the repository 323 on which is stored one or more projects, including $1^{st}$ Project 325 and $2^{nd}$ Project 327. The $1^{st}$ and $2^{nd}$ Projects 325, 327 maintain all the date necessary to determine artifact characteristics, including Group ID, artifact ID, version information, lists of its contributors, and one or more licenses. The $1^{st}$ and $2^{nd}$ Projects 325, 327 also include project logs. The details of the $1^{st}$ and $2^{nd}$ Projects 325, 327 are described in more detail in the co-pending applications cited above, but are briefly mentioned here so that it is understood that the server 301 can communicate with one or more repository 323 both to obtain and store data for scoring and rating artifacts, as well as for updating the one or more repositories 323 when information related to relevant actionable changes in artifacts are determined by the server 301.

The server 301 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 305, memory 306, a disk drive and/or removable storage medium can be referred to as "computer-readable storage media" and provide non-transitory storage of computer programs and data.

Figure 4:
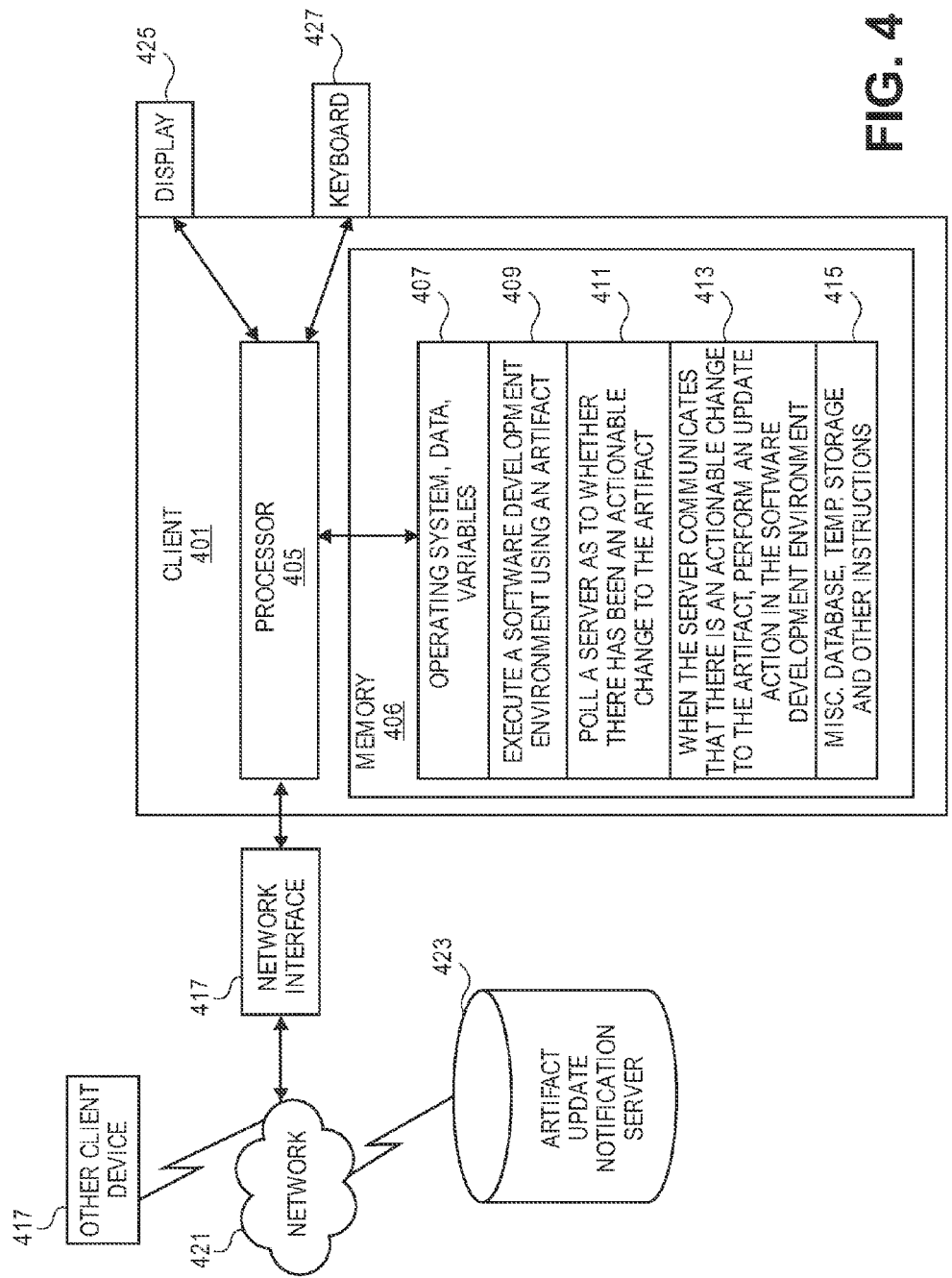
FIG. 4 is a block diagram illustrating an exemplary client in an artifact update notification system.

Referring now to FIG. 4, a block diagram illustrating an exemplary client in an artifact update notification system is discussed and described. The client 401 may include one or more a processor 405, a network interface 417 for communication with a network 421, a memory 406, a display 425, and/or a user input device such as a keyboard 427. Alternatively, or in addition to the keyboard 427, a user input device may comprise one or more of various known input devices, such as a keypad, a computer mouse, a touchpad, a touch screen, a trackball, and/or a keyboard. The display 425 may present information to the user by way of a conventional liquid crystal display (LCD) or other visual display, and/or by way of a conventional audible device (e.g., a speaker) for playing out audible messages.

The processor 405 may comprise one or more microprocessors and/or one or more digital signal processors. The memory 406 may be coupled to the processor 405 and may comprise a read-only memory (ROM), a random-access memory (RAM), a programmable ROM (PROM), and/or an electrically erasable read-only memory (EEPROM). The memory 406 may include multiple memory locations for storing, among other things, an operating system, data and variables 407 for programs executed by the processor 405; computer programs for causing the processor to operate in connection with various functions such as: execute 409 a software development environment using an artifact; poll 411 a server as whether there is an actionable change to the artifact with respect to artifact preferences; and when the server communicates that there is an actionable change to the artifact, perform 413 an update action in the software development environment. As will be understood in this field, besides the functions discussed above, the memory 406 can include other miscellaneous information in a miscellaneous database 415, along with the usual temporary storage and other instructions for other programs not considered herein.

Responsive to manual signaling from the user input device represented by the keyboard 427, and/or responsive to an automated signaling from a management program stored in the database 415, the processor 405 may direct the execution of the stored program related to executing a software development environment; polling 411 the server; and performing 413 an update action. It should be noted that the client 401 is able, through the network interface 417, and over a network 421, bidirectionally communicate with both the artifact update notification server 423, as well as one or more client device 417. This configuration enables the polling 411 and performing 413 functions listed above.

The application level results of the execution of programs 409, 411, 413, 415 have been described in detail above with respect to the artifact update notification system of FIG. 1 and the artifact update notification method of FIG. 2, each with reference to the related art data flows presented in FIG. 5. As such these details are not herein again described.

As mentioned above, the user input device may comprise one or more of various known input devices, such as the illustrated keyboard 427 and/or a pointing device, such as a mouse. The keyboard 427 may be supplemented or replaced with a scanner, card reader, or other data input device; and the pointing device may be a mouse, touch pad control device, track ball device, or any other type of pointing device. The display 425 is representative of a display that may present information to the user by way of a conventional liquid crystal display (LCD) or other visual display, and/or by way of a conventional audible device for playing out audible messages.

The client 401 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 405, memory 406, a disk drive and/or removable storage medium can be referred to as "computer-readable storage media" and provide non-transitory storage of computer programs and data.

The detailed descriptions which appear above may be presented in terms of program procedures executed on a computer or network of computers. These procedural descriptions and representations herein are the means used by those skilled in the art to most effectively convey the substance of their work to others skilled in the art.

Further, the embodiments disclosed herein have been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, implemented in a network including a server computer and a client computer, comprising:
    storing and updating, by the server computer, a preference as to a characteristic of a software artifact;
    executing, by the client computer, a software development environment using the software artifact; and
    performing, by the server computer and the client computer, an update cycle, including
        making, by the server computer, in view of the preference as to the characteristic of the software artifact, an actionable change determination as to whether there is a change in the characteristic of the software artifact that reaches a threshold level of significance;
        communicating, by the server computer to the client computer, the actionable change determination; and
        when the actionable change determination is that there is a change in the characteristic of the software artifact that reaches the threshold level of significance, performing by the client computer a specific action in the software development environment in response to the actionable change determination, wherein
    iterations of the update cycle are performed corresponding to repeated polling at regular time intervals from the client computer of the server computer for the actionable change determination.

2. The method according to claim 1, wherein
    the polling from the client computer of the server computer is implemented in the client computer through a plug-in operating in the software development environment.

3. The method according to claim 1, wherein
    the software development environment is one of an integrated development environment (IDE), a continuous integration (CI) system, and a repository management application.

4. The method according to claim 3, wherein
    the client computer performs the specific action in response to the actionable change determination according to a rules engine that associates the specific action with the characteristic of the software artifact.

5. The method according to claim 4, wherein
    the specific action associated with the characteristic of the software artifact in the rules engine varies depending on whether the IDE, the CI system, or the repository management application is the software development environment.

6. The method according to claim 1, wherein
    the characteristic of the software artifact and the preference as to the artifact characteristic are represented in the server as quantitative measurements, and
    the quantitative measurement of the characteristic of the software artifact is compared with the quantitative measurement of the preference as to the software artifact by the server in making the actionable change determination.

7. A system, comprising:
    a server computer that stores and updates a preference as to a characteristic of a software artifact; and
    a client computer that executes a software development environment using the software artifact, wherein
    the server computer and the client computer perform an update cycle, including:
        the server computer making, in view of the preference as to the characteristic of the software artifact, an actionable change determination as to whether there is a change in the characteristic of the software artifact that reaches a threshold level of significance;
        the server communicating to the client computer the actionable change determination; and
        when the actionable change determination is that there is a change in the characteristic of the software artifact that reaches the threshold level of significance, the client computer performing a specific action in the software development environment in response to the actionable change determination, wherein
    iterations of the update cycle are performed corresponding to repeated polling at regular time intervals from the client computer of the server computer for the actionable change determination.

8. The system according to claim 7, wherein
    the polling from the client computer of the server computer is implemented in the client computer through a plug-in operating in the software development environment.

9. The system according to claim 7, wherein
    the software development environment is one of an integrated development environment (IDE), a continuous integration (CI) system, and a repository management application.

10. The system according to claim 9, wherein
    the client computer performs the specific action in response to the actionable change determination according to a rules engine that associates the specific action with the characteristic of the software artifact.

11. The system according to claim 10, wherein
    the specific action associated with the characteristic of the software artifact in the rules engine varies depending on whether the IDE, the CI system, or the repository management application is the software development environment.

12. The system according to claim 7, wherein
the characteristic of the software artifact and the preference as to the artifact characteristic are represented in the server as quantitative measurements, and
the quantitative measurement of the characteristic of the software artifact is compared with the quantitative measurement of the preference as to the software artifact by the server in making the actionable change determination.

13. A computer-readable, non-transitory storage medium, with instructions stored thereon such that when the instructions are executed by a client computer, a method is performed comprising:
repeatedly polling by the client computer at regular time intervals of a server computer,
which stores and updates a preference as to a characteristic of a software artifact, and
which is connected over a network with the client computer, which further executes a software development environment using the software artifact,
for an actionable change determination, made by the server in view of the preference as to the characteristic of the software artifact, as to whether there is a change in the characteristic of the software artifact that reaches a threshold level of significance;
repeatedly receiving by the client computer from the server computer the actionable change determination determined by the server computer; and
in those instances when the actionable change determination is that there is a change in the characteristic of the software artifact that reaches the threshold level of significance, performing a specific action in the software development environment in response to the actionable change determination.

14. The computer-readable, non-transitory storage medium according to claim 13, wherein
the software development environment is one of an integrated development environment (IDE), a continuous integration (CI) system, and a repository management application.

15. The computer-readable, non-transitory storage medium according to claim 14, wherein
the specific action is performed in response to the actionable change determination according to a rules engine that associates the specific action with the characteristic of the software artifact.

16. The computer-readable, non-transitory storage medium according to claim 15, wherein
the specific action associated with the characteristic of the software artifact in the rules engine varies depending on whether the IDE, the CI system, or the repository management application is the software development environment.

17. A computer-readable, non-transitory storage medium, with instructions stored thereon such that when the instructions are executed by a server computer, a method is performed comprising:
receiving by the server computer, at regular time intervals, repeated polling from a client computer,
which executes a software development environment using a software artifact, and
which is connected over a network with the server computer, which further stores and updates a preference as to a characteristic of the software artifact,
for an actionable change determination, made by the server computer in view of the preference as to the characteristic of the software artifact, as to whether there is a change in the characteristic of the software artifact that reaches a threshold level of significance;
in response to each poll from the client computer, making by the server computer the actionable change determination; and
communicating by the server computer to the client computer each actionable change determination, the client computer further, in those instances when the actionable change determination is that there is a change in the characteristic of the software artifact that reaches the threshold level of significance, performing a specific action by the client computer in the software development environment in response to the actionable change determination.

18. The computer-readable, non-transitory storage medium according to claim 17, wherein
the characteristic of the software artifact and the preference as to the artifact characteristic are represented in the server computer as quantitative measurements, and
the quantitative measurement of the characteristic of the software artifact is compared with the quantitative measurement of the preference as to the software artifact by the server in making each actionable change determination.

* * * * *